United States Patent
Lee et al.

(10) Patent No.: US 11,172,434 B2
(45) Date of Patent: **\*Nov. 9, 2021**

(54) METHOD AND APPARATUS OF SCANNING IN WIRELESS LOCAL AREA NETWORK SYSTEM

(71) Applicant: ELECTRONICS AND TELECOMMUNICATIONS RESEARCH INSTITUTE, Daejeon (KR)

(72) Inventors: Jae Seung Lee, Daejeon (KR); Min ho Cheong, Seoul (KR); Je Hun Lee, Daejeon (KR); Ja Beom Gu, Daejeon (KR); Jae Woo Park, Daejeon (KR); Sok Kyu Lee, Daejeon (KR)

(73) Assignee: ELECTRONICS AND TELECOMMUNICATIONS RESEARCH INSTITUTE, Daejeon (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 16/431,487

(22) Filed: Jun. 4, 2019

(65) Prior Publication Data

US 2019/0289539 A1    Sep. 19, 2019

Related U.S. Application Data

(63) Continuation of application No. 15/071,128, filed on Mar. 15, 2016, now Pat. No. 10,356,700, which is a
(Continued)

(30) Foreign Application Priority Data

Dec. 22, 2011  (KR) .................. 10-2011-0139937
Dec. 29, 2011  (KR) .................. 10-2011-0146052
(Continued)

(51) Int. Cl.
*H04W 84/18*    (2009.01)
*H04W 84/12*    (2009.01)
(Continued)

(52) U.S. Cl.
CPC ........... *H04W 48/16* (2013.01); *H04W 40/08* (2013.01); *H04W 48/14* (2013.01); *H04W 84/12* (2013.01); *H04W 88/08* (2013.01)

(58) Field of Classification Search
CPC ..... H04W 40/08; H04W 48/14; H04W 88/08; H04W 84/12; H04W 48/16
See application file for complete search history.

(56) References Cited

U.S. PATENT DOCUMENTS

| 2005/0068928 A1\* | 3/2005 | Smith ................... H04W 48/16 370/338 |
| 2006/0092883 A1\* | 5/2006 | Lee ....................... H04W 36/30 370/332 |

(Continued)

FOREIGN PATENT DOCUMENTS

| KR | 20060031867 | 4/2006 |
| KR | 20090066642 | 6/2009 |
| KR | 20110085836 | 7/2011 |

OTHER PUBLICATIONS

IEEE Explore, Kwak et al., Reducing the Channel Scanning Latency for Intermittently Connected IEEE 802.11 Networks in Vehicular Environments, May 2008 (Year: 2008).\*
(Continued)

*Primary Examiner* — Un C Cho
*Assistant Examiner* — Peter K Mak

(57) ABSTRACT

A scanning method in a wireless local area network (WLAN) system is provided. The scanning method includes transmitting, by a station, a probe request frame and receiving, by the station, a probe response frame from an access point (AP). The AP determines whether to transmit the probe
(Continued)

response frame in response to the probe request frame using information indicated by the probe request frame.

4 Claims, 26 Drawing Sheets

Related U.S. Application Data continuation of application No. 13/725,396, filed on Dec. 21, 2012, now Pat. No. 9,307,484.

(30) Foreign Application Priority Data

| | | |
|---|---|---|
| Jan. 12, 2012 | (KR) | 10-2012-0004095 |
| Jan. 17, 2012 | (KR) | 10-2012-0005374 |
| Mar. 13, 2012 | (KR) | 10-2012-0025299 |
| Mar. 15, 2012 | (KR) | 10-2012-0026331 |
| Jul. 6, 2012 | (KR) | 10-2012-0074226 |
| Dec. 21, 2012 | (KR) | 10-2012-0150982 |

(51) Int. Cl.
| | |
|---|---|
| *H04W 48/20* | (2009.01) |
| *H04L 12/759* | (2013.01) |
| *H04W 48/16* | (2009.01) |
| *H04W 40/08* | (2009.01) |
| *H04W 48/14* | (2009.01) |
| *H04W 88/08* | (2009.01) |

(56) References Cited

U.S. PATENT DOCUMENTS

| | | | |
|---|---|---|---|
| 2006/0111103 A1* | 5/2006 | Jeong | H04W 48/16 455/434 |
| 2006/0159041 A1 | 7/2006 | Zhun | |
| 2006/0256742 A1* | 11/2006 | Lee | H04W 74/002 370/278 |
| 2007/0058588 A1* | 3/2007 | Fashandi | H04W 36/0085 370/331 |
| 2007/0177549 A1* | 8/2007 | Lo | H04W 36/18 370/331 |
| 2008/0056211 A1 | 3/2008 | Kim et al. | |
| 2010/0008277 A1* | 1/2010 | Kopikare | H04W 52/0206 370/311 |
| 2011/0090890 A1* | 4/2011 | Seok | H04W 72/0453 370/338 |
| 2011/0205910 A1* | 8/2011 | Soomro | H04W 80/04 370/252 |
| 2012/0322481 A1* | 12/2012 | Laroche | H04W 48/16 455/509 |
| 2014/0211680 A1* | 7/2014 | Seok | H04W 52/0206 370/311 |

OTHER PUBLICATIONS

IEEE Computer Society, Murray et al., Scanning Delays in 802.11 Networks. (Year: 2007).*

Sarma, et al., "A Zone Based Interleaved Scanning Technique for Fast Handoff in IEEE 802.11 Wireless Networks," IEEE, 10th International Symposium on Pervasive Systems, Algorithms, and Networks, 2009, pp. 232-237.

* cited by examiner

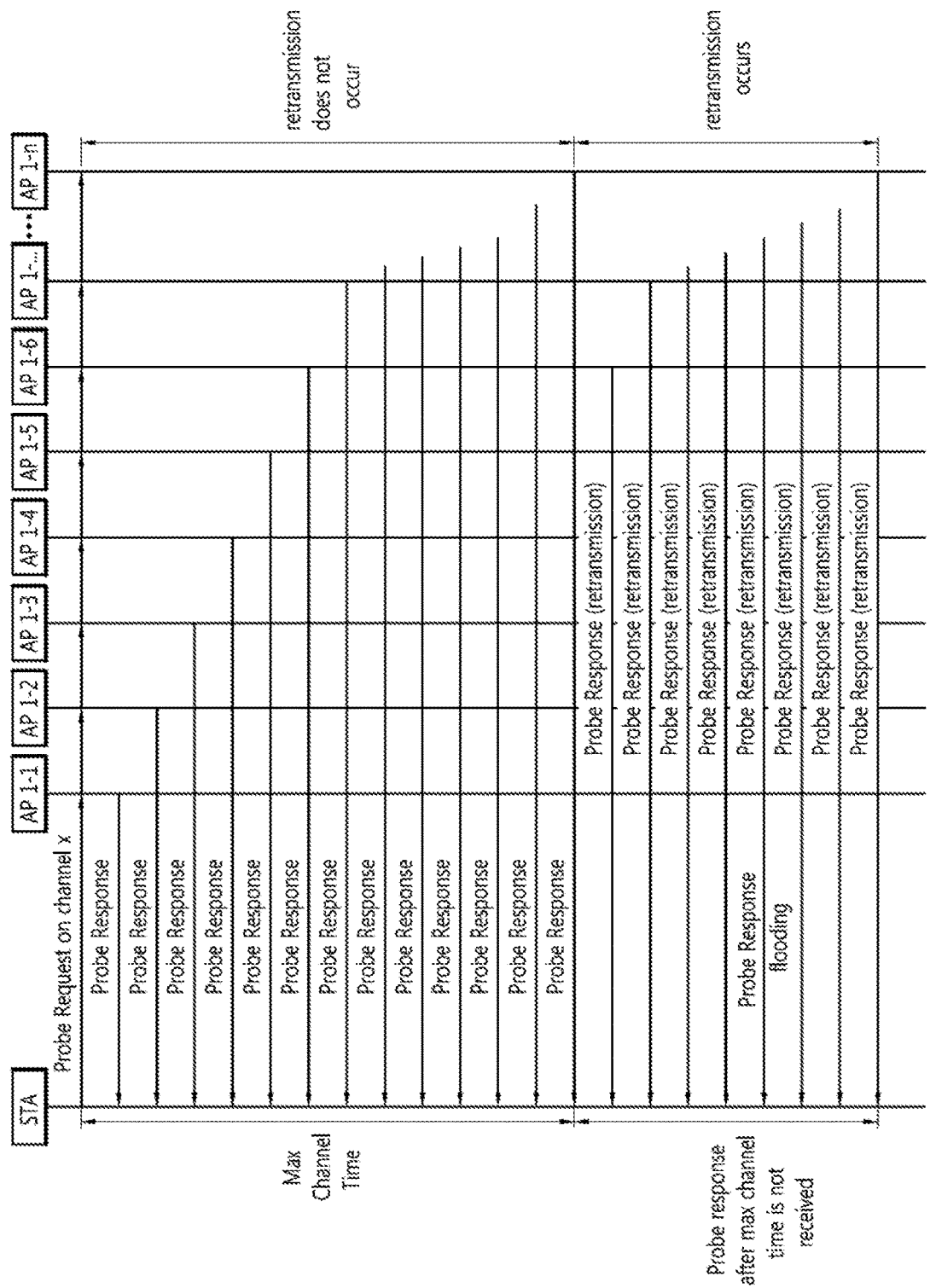

| Filter Request | Require Security | Require No Security | Require HT | Require VHT | Require non-VHT | Reserved |
|---|---|---|---|---|---|---|
| 1 | 1 | 1 | 1 | 1 | 1 | 10 |

Bits:

| Filter Request | Require Security | Require HT | Require VHT | Require non-VHT | Reserved |
|---|---|---|---|---|---|
| 1 | 1 | 1 | 1 | 1 | 11 |

Bits:

FIG. 13

| Element ID | Length | Version | Group Data Cipher Suite Count | Group Data Cipher Suite List | Pairwise Cipher Suite Count | Pairwise Cipher Suite List |  AKM Suite Count | AKM Suite List |
|---|---|---|---|---|---|---|---|---|
| 1 | 1 | 2 | 2 | 4 x m | 2 | 4 x n | 2 | 4 x o |

Octets:

1310

| RSN Capabilities | Group Management Cipher Suite Count | Group Management Cipher Suite List |
|---|---|---|
| 2 | 2 | 4 x p |

Octets:

(m: Group Data Cipher Suite Count, n: Pairwise Cipher Suite Count, o: AKM Suite Count, p: Group Management Cipher Suite Count)

FIG. 15A

| Element ID | Length | Version | Group Data Cipher Suite Count | Group Data Cipher Suite list | Pairwise Cipher Suite Count | Pairwise Cipher Suite list | AKM Suite Count | AKM Suite List |
|---|---|---|---|---|---|---|---|---|
| 1 | 1 | 2 | 2 | 4 x m | 2 | 4 x n | 2 | 4 x o |

| RSN Capabilities | Group Management Cipher Suite |
|---|---|
| 2 | 2 |

Octets:

(m: Group Data Cipher Suite Count, n: Pairwise Cipher Suite Count, o: AKM Suite Count)

FIG. 15B

| Element ID | Length | Version | Group Data Cipher Suite | Pairwise Cipher Suite Count | Pairwise Cipher Suite list | AKM Suite Count | AKM Suite List |
|---|---|---|---|---|---|---|---|
| 1 | 1 | 2 | 2 | 2 | 4 x n | 2 | 4 x o |

| RSN Capabilities | Group Management Cipher Suite Count | Group Management Cipher Suite List |
|---|---|---|
| 2 | 2 | 4 x p |

Octets:

(n: Pairwise Cipher Suite Count, o: AKM Suite Count, p: Group Management Cipher Suite Count)

FIG. 18A

| Element ID | Length | Filtering Preference | Supported Credential Type | Security capability element | Other capability /preference elements |
|---|---|---|---|---|---|
| 1 | 1 | 1~2 | 1~2 | variable | |

Octets:

| SIM Support | USIM Support | NFC Support | Pre-Shared Key | X.509 Certificate | Username /Password | One Time Password | Server Side authentication only | TBD |
|---|---|---|---|---|---|---|---|---|
| 1 | 1 | 1 | 1 | 1 | 1 | 1 | 1 | variable |

Bits:

FIG. 20

| Require Security | Require No Security | Require HT | Require VHT | Require non-HT | Require Internet Access | Reserved |
|---|---|---|---|---|---|---|
| 1 | 1 | 1 | 1 | 1 | 1 | variable |

Octets:

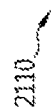

FIG. 22A

| Network Filtering Control | Preferred Advertisement Protocol | Supported Device type | Preferred Access Network | Required Service | Reserved |
|---|---|---|---|---|---|
| 1 | 1 | 1 or more | 1 | variable | variable |

Octets:

| Filter by supported Adv. Protocol | Filter unsupported Device type | Filter by Access Network Preference | Filter by supported venue | Filter by supported Services | Reserved |
|---|---|---|---|---|---|
| 1 | 1 | 1 | 1 | 1 | 3 or more |

Bits:

FIG. 22C

| ANQP | MIH Information Service | MIH Command and Event Service Capability Discovery | Emergency Alert System (EAS) | Reserved |
|---|---|---|---|---|
| 1 | 1 | 1 | 1 | 4 |

Bits:

FIG. 22D

| WLAN | 3GPP | WiMAX | Reserved |
|---|---|---|---|
| 1 | 1 | 1 | 5 |

Bits:

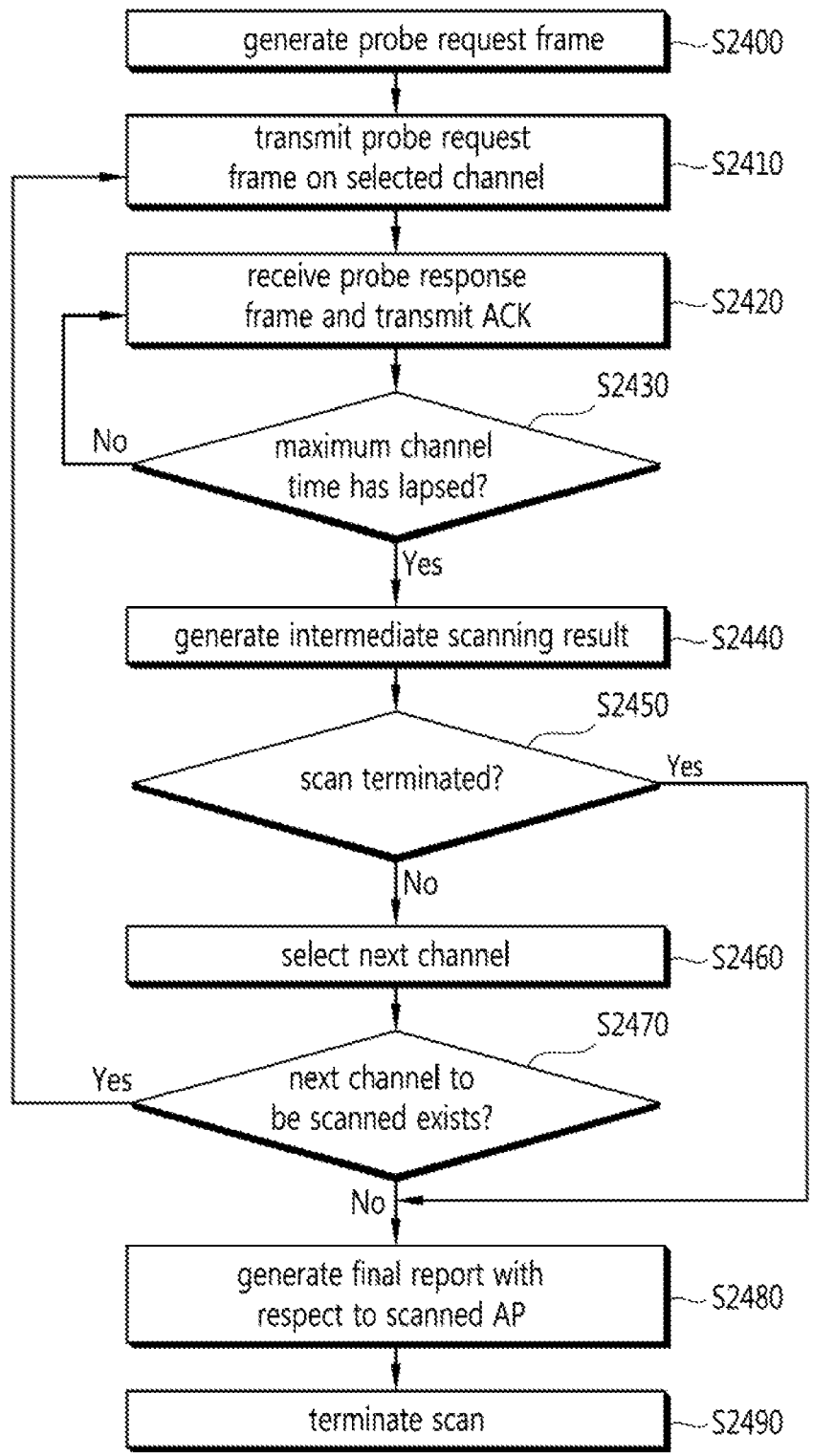

METHOD AND APPARATUS OF SCANNING IN WIRELESS LOCAL AREA NETWORK SYSTEM

CROSS-REFERENCE TO RELATED APPLICATIONS

This application is a continuation of U.S. application Ser. No. 15/071,128, filed Mar. 15, 2016, which is a continuation of U.S. application Ser. No. 13/725,396, filed Dec. 21, 2012, now U.S. Pat. No. 9,307,484, which claims the benefit of Korean Patent Application No. 10-2011-0139937 filed on Dec. 22, 2011, Korean Patent Application No. 10-2011-0146052 filed on Dec. 29, 2011, Korean Patent Application No. 10-2012-0004095 filed on Jan. 12, 2012, Korean Patent Application No. 10-2012-0005374 filed on Jan. 17, 2012, Korean Patent Application No. 10-2012-0025299 filed on Mar. 13, 2012, Korean Patent Application No. 10-2012-0026331 filed on Mar. 15, 2012, Korean Patent Application No. 10-2012-0074226 filed on Jul. 6, 2012, and Korean Patent Application No. 10-2012-0150982 filed on Dec. 21, 2012, all of which are incorporated by reference in its entirety herein.

BACKGROUND OF THE INVENTION

Field of the Invention

The present invention relates to wireless communications, and more particularly, to a scanning method in a wireless local area network (WLAN).

Related Art

With the recent development of information communication technology, a variety of wireless communication techniques are being developed. From among them, a WLAN is technology for wirelessly accessing the Internet at homes or companies or in specific service providing areas by using portable terminals, such as a Personal Digital Assistant (PDA), a laptop computer, and a Portable Multimedia Player (PMP), based on radio frequency technology.

Communication in a WLAN according to the IEEE 802.11 standard is premised on that communication is made within an area known as a basic service set (BSS). A BSS area may change according to propagation characteristics of a wireless medium, so a boundary thereof is somewhat indefinite. A BSS may be basically classified into an independent BSS (IBSS) and an infrastructure BSS. The IBSS refers to a BSS forming a self-contained network in which an access to a distribution system (DS) is not permitted, and the infrastructure BSS refers to a BSS including one or more access points (APs), a distribution system, and the like, in which an AP is used in every communication process including communication between stations (STAs).

When a STA wants to access a wireless network, the STA may use two scanning methods including passive scanning and active scanning to discover an accessible wireless network (e.g., a BSS, an IBSS, etc.), namely, an AP to which the STA is to be connected. A passive scanning method uses a beacon frame transmitted from an AP (or an STA).

Namely, when an STA wants to access a wireless network, the STA receives a beacon frame periodically transmitted from an AP, or the like, that manages the corresponding wireless network (e.g., a BSS, an IBSS, etc.) to discover an accessible wireless network (e.g., a BSS, an IBSS, etc.). In the case of passive scanning, the STA should wait until when a beacon frame is transmitted from the AP, so much time may be taken for the STA to discover the AP.

In general, a transmission period of a beacon frame is 100 ms.

According to an active scanning method, an STA, which wants to access a wireless network, first transmits a probe request frame and an AP (or an STA), which has received the probe request frame, responds thereto by a probe response frame. Here, every AP, which has received the probe request frame, responds by a probe response frame, flooding of probe response frames occurs. Also, since the STA sequentially scans every channel of a wireless medium, a scanning time may be lengthened.

Thus, a scanning method for reducing flooding of probe response frames and shortening time required for performing scanning is required.

SUMMARY OF THE INVENTION

The present invention provides an active scanning method and apparatus capable of shortening an initial link setup time in a wireless local area network (WLAN) system.

The present invention also provides an active scanning method and apparatus capable of reducing flooding of probe response frames.

In an embodiment of the present invention, a scanning method in a wireless local area network (WLAN) system is provided. The method includes transmitting, by a station, a probe request frame and receiving, by the station, a probe response frame from an access point (AP). The AP determines whether to transmit the probe response frame in response to the probe request frame using information indicated by the probe request frame.

The information indicated by the probe request frame comprises information on a first requirement with respect to access delay of the AP. The AP determines whether to respond to the probe request frame based on the information on the first requirement The AP does not respond to the probe request frame if access delay according to the first requirement is shorter than an average access delay of the AP.

The information indicated by the probe request frame comprises information on a second requirement with respect to at least one of high throughput (HT) capability, very high throughput (VHT) capability or high efficiency WLAN (HEW) capability of the AP. The AP determines whether to respond to the probe request frame based on the information on the second requirement.

The information indicated by the probe request frame comprises information on a third requirement with respect to received channel power indicator (RCPI).

In another embodiment of the present invention, a scanning method in a wireless local area network (WLAN) system is provided. The method includes receiving, by an access point (AP), a probe request frame from a station, determining, by the AP, whether to transmit a probe response frame in response to the probe request frame using information indicated by the probe request frame, and transmitting, by the AP, the probe response frame to the station if the AP determines to transmit the probe response frame.

The information indicated by the probe request frame comprises information on a first requirement with respect to access delay of the AP. The determining comprises determining whether to respond to the probe request frame based on the information on the first requirement.

The AP does not respond to the probe request frame if access delay according to the first requirement is shorter than an average access delay of the AP.

The information indicated by the probe request frame comprises information on a second requirement with respect to at least one of high throughput (HT) capability, very high throughput (VHT) capability or high efficiency WLAN (HEW) capability of the AP. The determining comprises determining whether to respond to the probe request frame based on the information on the second requirement.

The information indicated by the probe request frame comprises information on a third requirement with respect to received channel power indicator (RCPI).

BRIEF DESCRIPTION OF THE DRAWINGS

FIGS. 2A-2B and 3 are flow charts illustrating an active scanning method in a WLAN system.

FIGS. 12A-12B illustrate an example of a filter preference field format included in the capability filter information (CapabilityFilterInfo) element.

FIG. 13 illustrates an example of a security capability element field format included in a capability filter information (CapabilityFilterInfo) element according to an embodiment of the present invention.

FIGS. 15A-15B illustrate another example of a security capability element field format included in a capability filter information (CapabilityFilterInfo) element according to an embodiment of the present invention.

FIGS. 18A-18B illustrate another example of capability filter information (CapabilityFilterInfo) according to an embodiment of the present invention.

FIG. 20 illustrates another example of a Filtering Preference field format included in a capability filter information (CapabilityFilterInfo) element according to an embodiment of the present invention.

FIGS. 21A-21B illustrate an example of information included in an AP operating condition preference element according to an embodiment of the present invention.

FIGS. 22A-22D illustrate an example of information included in an AP network preference element according to an embodiment of the present invention.

FIG. 24 is a flow chart illustrating a process of performing active scanning by an STA that transmits a probe request frame according to an embodiment of the present invention.

DESCRIPTION OF EXEMPLARY EMBODIMENTS

Hereinafter, some embodiments of the present invention are described in detail with reference to the accompanying drawings in order for those skilled in the art to be able to readily implement the invention. Furthermore, the present invention is not limited to the following embodiments and may be modified in various ways within the scope of the technical spirit of the present invention.

Elements described in this specification may include additional elements other than elements to be described later, at need, and a detailed description of parts not directly related to the present invention or redundant parts is omitted. Furthermore, when it is said that any part includes (or comprises) any element, it means the part does not exclude other elements and may further include other elements.

Figure 1:
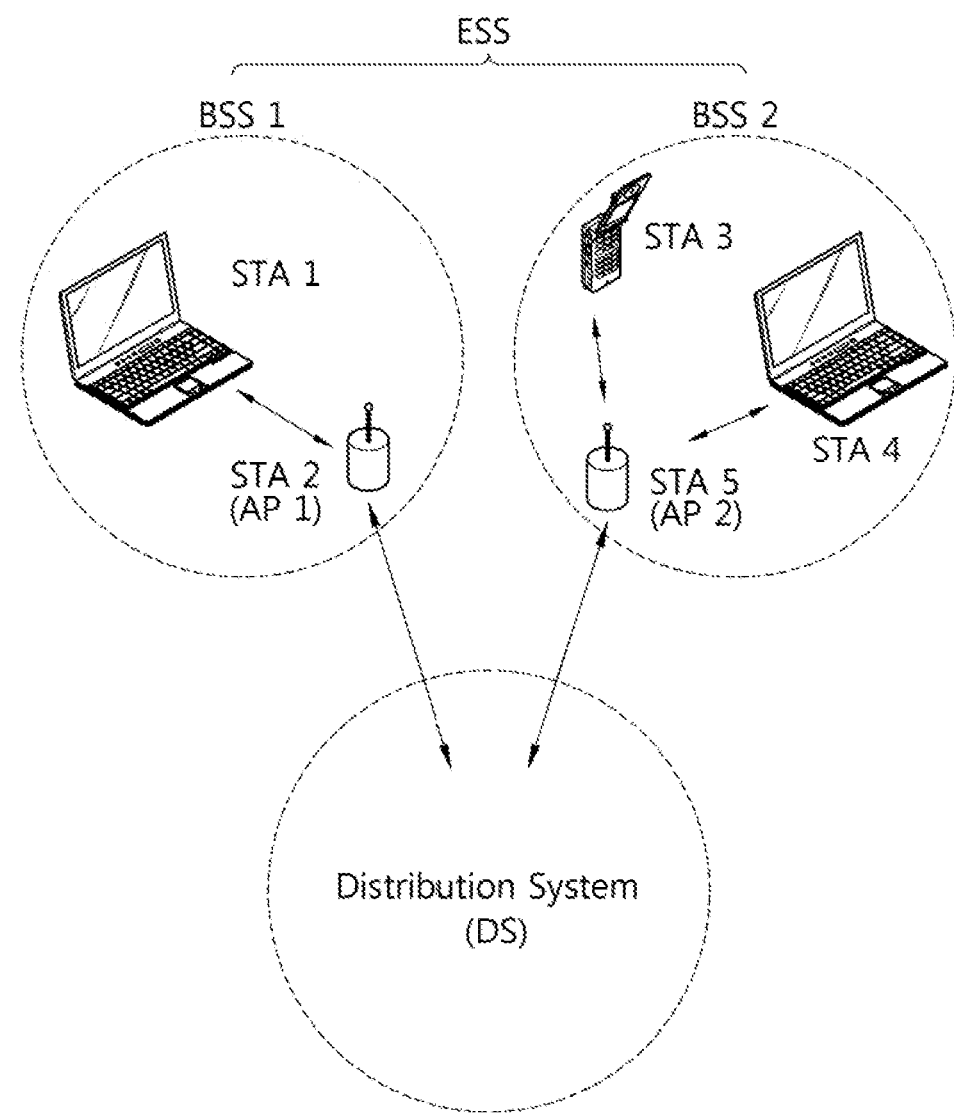
FIG. 1 is a view schematically illustrating an example of a wireless local area network (WLAN) system to which an embodiment of the present invention is applicable.

FIG. 1 is a view schematically illustrating an example of a wireless local area network (WLAN) system to which an embodiment of the present invention is applicable.

Referring to FIG. 1, a WLAN system includes one or more basic service sets (BSSs). A BSS refers to a set of stations (STAs) that can communicate with each other in synchronization, rather than a concept indicating a particular area. A BSS may be classified into an infrastructure BSS and an independent BSS (IBSS), and FIG. 1 illustrates an infrastructure BSS.

An infrastructure BSS (BSS1 and BSS2) may include one or more non-AP stations (STA1, STA3, STA4), an access point (AP) providing a distribution service (DS), and a distribution system (DS) connecting a plurality of APs (AP1 and AP2). In the infrastructure BSS, the AP STA may manage the non-AP STAs of the BSS.

Meanwhile, the IBSS is a BSS operating in an ad-hoc mode. The IBSS does not include an AP, so it cannot be a centralized management entity performing a management function at the center. In the IBSS, every STA may be configured as a mobile station, and the IBSS establishes a self-contained network, not allowing an access to a distribution system (DS).

A station (STA) is a certain functional medium including a medium access control (MAC) following the stipulation of the IEEE 802.11 standard and a physical layer interface with respect to a wireless medium. A station includes both AP and non-AP stations in a broad sense. A station for wireless communication may include a processor and a transceiver, and may further include a user interface, a display unit, and the like. The processor, a function unit devised to generate a frame to be transmitted via a wireless network or process a frame received via the wireless network, performs various functions to control a station. The transceiver, which is functionally connected with the processor, is configured to transmit and receive frames via the wireless network for the station.

Among the stations STAs, mobile terminal manipulated by a user are non-AP STA (STA1, STA3, STA4, STA5). The non-AP STA may be referred to by other names such as terminal, wireless transmit/receive unit (WTRU), user equipment (UE), mobile station (MS), mobile terminal, mobile subscriber unit, or the like.

The APs (AP1 and AP2) are functional entities for providing an access to the DS by way of a wireless medium for an STA (Associated Station) associated thereto. In the infrastructure BSS including the APs, in principle, communications between non-AP STAs are made by way of the APs, but when a direct link has been established (e.g., when a DLS or TDLS service is supported), the non-AP STAs can directly communicate with each other. The AP may also be called by other names such as centralized controller, base station (BS), node-B, base transceiver system (BTS), site controller, and the like.

A plurality of infrastructure BSSs may be connected via the DS. The plurality of BSSs connected via the DS is called an extended service set (ESS). STAs included in the ESS may communicate with each other, and a non-AP STA may move from one BSS to another BSS within the same ESS while seamlessly performing communication.

The DS is a mechanism allowing one AP to communicate with another AP. Through the DS, an AP may transmit a frame for STAs associated to the BSS managed by the AP, transfer a frame when one STA moves to another BSS, or transmit or receive frames to and from an external network such as a wireline network. The DS may not be necessarily a network. Namely, the DS is not limited to any form so long as it can provide a certain distribution service stipulated in the IEEE 802.11 standard. For example, the DS may be a wireless network such as a mesh network or a physical structure connecting the APs.

Figure 2A:
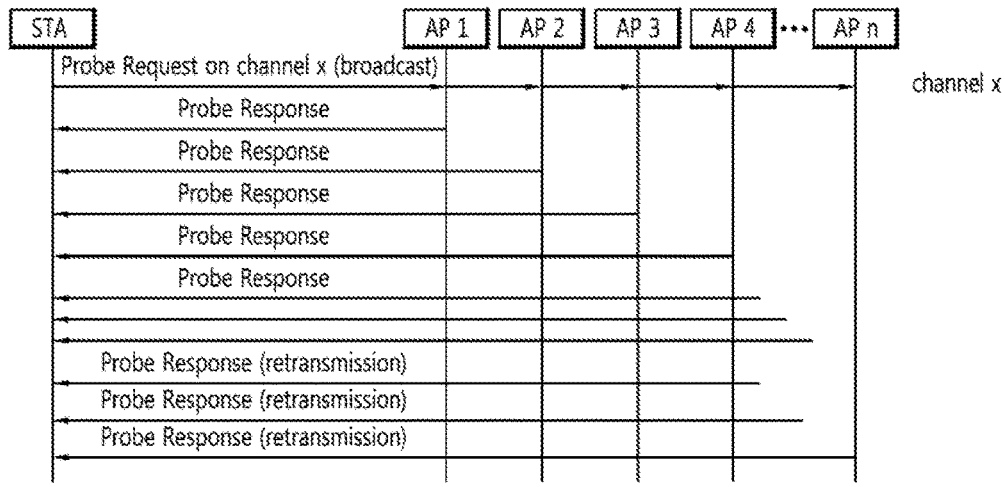
Figure 2B:
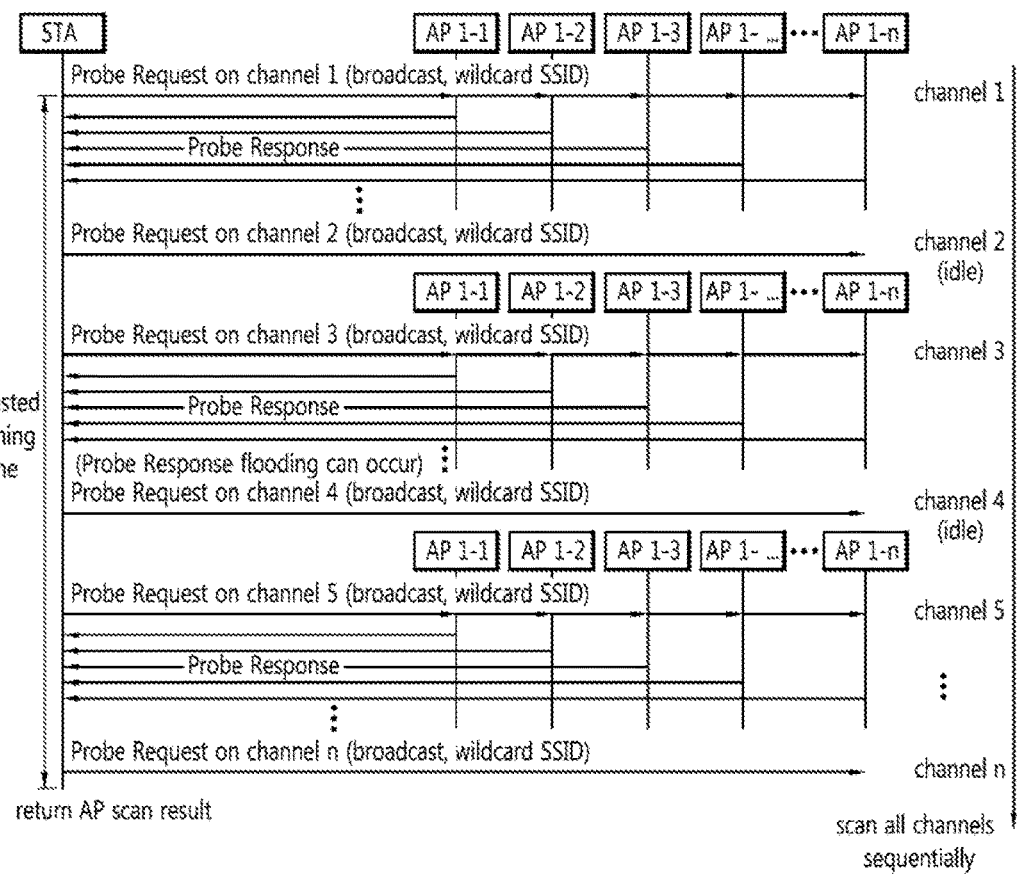

FIGS. 2A-2B and 3 are flow charts illustrating an active scanning method in a WLAN system. FIG. 2A is a flow chart illustrating a process of performing active scanning on one channel in the WLAN system, and FIG. 2B is a flow chart illustrating a process of performing active scanning on a plurality of channels in the WLAN system.

Referring to FIGS. 2A, 2B and 3, when an STA wants to access a WLAN system such as the ESS illustrated in FIG. 1, the STA transmits a probe request frame to each channel of the WLAN system in a unicast manner or a broadcast manner. Here, the STA detects a state of one channel during a minimum channel time (MinChannelTime). Namely, the STA detects whether the channel is active or inactive. If the STA does not detect activity of one channel during the minimum channel time (channel 2, channel 4, or the like, illustrated in FIG. 2B), the STA regards the channel as being inactive and scans another channel. Meanwhile, when the STA detects activity of one channel within the minimum channel time, the STA waits to receive 2A probe response frame(s) in the channel during max channel time (MaxChannelTime) which is longer than the minimum channel time. When the maximum channel time is reached, the STA processes probe response frames received up to that time, and scans a next channel in the same manner as described above. In this manner, the STA may select an AP based on the scanning results with respect to respective channels of the WLAN system.

As described above, in the existing active scanning method, when the STA broadcasts the probe request frame to each channel, the STA generally does not have accurate information regarding a service set identifier (SSID), or the like, of an AP to which the STA wants to be connected, the STA uses a wild card SSID. Here, all the APs, which have received the probe request frame from the STA, respond by a probe response frame, respectively, flooding of the probe response frames occurs.

Also, since the STA sequentially scans all the channels during a predetermined period of time regardless of particular information included the probe response frames of the APs, a scanning time is lengthened to result in a lengthened initial link setup time for the STA to be connected to the WLAN system. As illustrated in FIG. 2B, although the STA discovers an AP appropriate to be associated according to the result of scanning of channel 1, the STA scans up to a final channel, so the scanning time may be lengthened more than necessary.

Meanwhile, when the AP receives the probe request frame from the STA, the AP unconditionally transmits a probe response frame without consideration of whether to associate the corresponding STA, whether the STA, which transmitted the probe request frame, is in a state of being able to receive a probe response frame, and the like.

For example, as illustrated in FIG. 2B, for example, in case that APs such as AP 1-2, AP 1-3, AP 3-3, or the like, receive the probe request frame from the STA not supporting capability requested by the APs, although the STA requests association to the APs such as AP 1-2, AP 1-3, and AP 3-3 afterwards, the APs will not permit association of the STA thereto, but the APs transmit a probe response frame to the STA. Such a probe response frame is an unnecessary packet transmission, and although the STA selects the APs and requests an association thereto, the association request will be rejected by the APs, so the probe response frame causes delay in an association process.

Also, as illustrated in FIG. 3, when the APs unconditionally transmit probe response frames to the STA without considering whether the STA, which has transmitted the probe request frame, is in a state of being able to receive the probe response frames, flooding of the probe response frames may further caused. The STA, which has transmitted the probe request frame, receives the probe response frames from the APs during a maximum channel time in the corresponding channel, and when the maximum channel time has passed, the STA scans a next channel, so the STA cannot receive a probe response frame transmitted via the corresponding channel after the maximum channel time. However, in the existing active scanning method, as mentioned above, the AP transmits the probe response frame without consideration of a state of the STA which has transmitted the probe request frame, and when the maximum channel time has passed, the probe response frame is not received by the STA which has transmitted the probe request frame. Since the probe response frame is transmitted in a unicast manner, if it is not received by the corresponding STA, the AP, which has transmitted the probe response frame, retransmits a probe response frame. Here, if the maximum channel time has passed, the corresponding STA cannot receive the retransmitted probe response frame. Thus, the AP keeps transmitting of the probe response frame, causing serious frame response flooding.

Hereinafter, an effective active scanning method capable of reducing probe response flooding and shortening a scanning time by solving the problem of the existing active scanning method as described above will be described.

Figure 4:
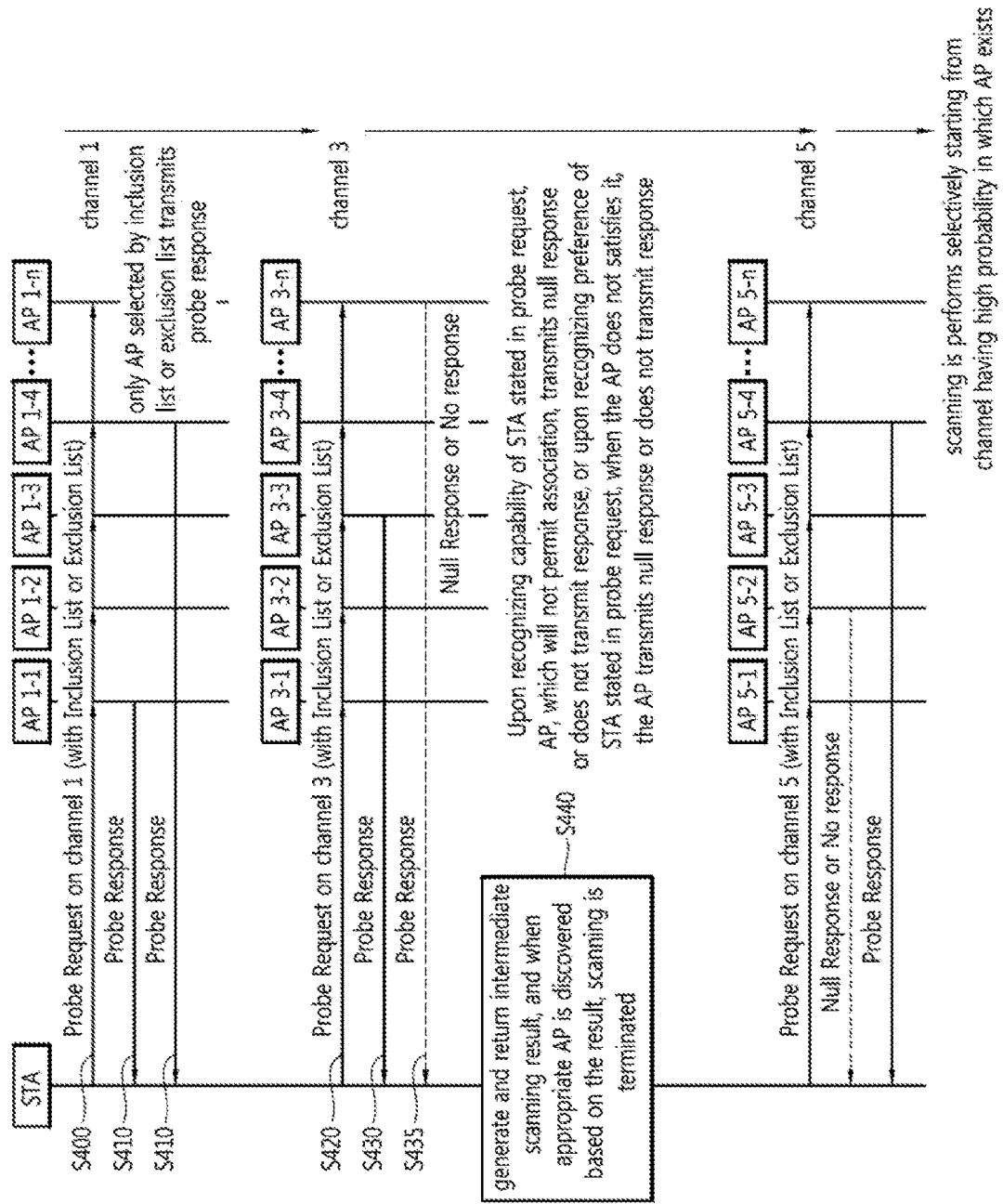
FIGS. 4 and 5 are flow charts illustrating an active scanning method in a WLAN system according to an embodiment of the present invention.
Figure 5:
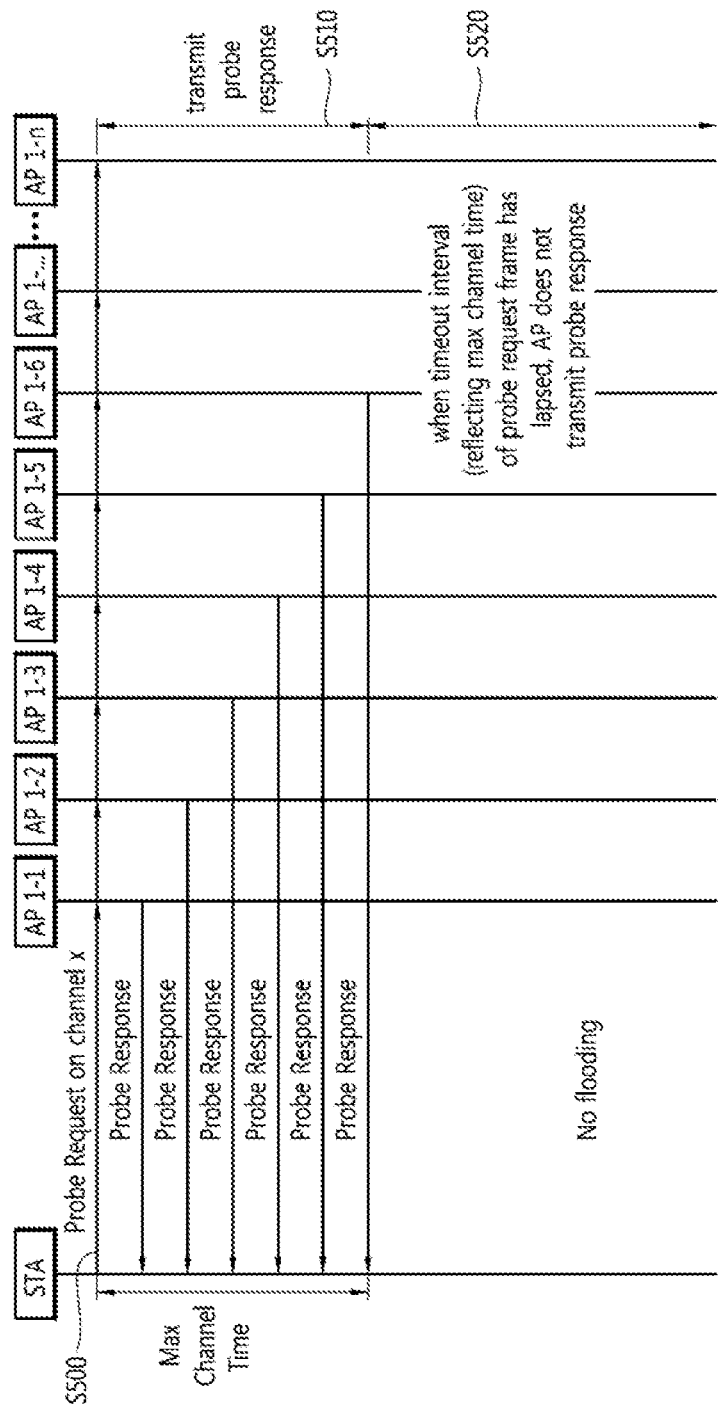

FIGS. 4 and 5 are flow charts illustrating an active scanning method in a WLAN system according to an embodiment of the present invention. The flow charts between the STA and the APs may be a procedure performed between a non-AP STA and APs constituting an infrastructure BSS, but obviously, the present invention is not limited thereto. For example, the present embodiment may be applied in the same or equal manner to an operation between non-AP STAs constituting an IBS S, an operation between mesh points (MPs) constituting a mesh network system, and even an operation between terminals or between a terminal and a base station constituting a different wireless communication system, except for a case which is not available in essence.

Referring to FIGS. 4 and 5, the STA transmits a probe request frame including a list indicating information regarding a response-target AP via a channel in a broadcast manner or a unicast manner (S400). In response thereto, the STA receives probe response frames from an AP based on the list indicating information regarding the response target AP included in the probe request frame (S410).

The list indicating information regarding the response target AP may include information regarding a response target AP which is to respond to the probe request frame, and the list may be configured by using at least one of an SSID (Service Set Identifier), a BSSID (Basic Service Set Identifier), an MESHID (Mesh Identifier), an HESSID (Extended to Service Set Identifier), and a network ID of a response target AP. For example, the list indicating information regarding a response target AP may be included in the probe request frame by using an inclusion list as described hereinafter, and details thereof will be described later.

For example, as illustrated in FIG. 4, the STA may broadcast a probe request frame including a list (e.g., an inclusion list) indicating information regarding a response target AP via a channel 1. When an AP (e.g., AP 1-1, AP 1-2, . . . , AP 1-n), which has received the probe request frame, corresponds to the list indicating information regarding the response target AP included in the probe request frame, the corresponding AP (e.g., AP1-1, etc.) may transmit a probe response frame to the STA.

Also, besides the list indicating information regarding the response target AP as described above, the probe request frame may include a list indicating information regarding a response non-target AP which should not respond to the probe request frame. For example, the list indicating information regarding a response non-target AP may be included in the probe request frame by using an exclusion list as described hereinafter, and the exclusion list may be configured by using at least one of an SSID (Service Set Identifier), a BSSID (Basic Service Set Identifier), an MESHID (Mesh Identifier), an HESSID (Extended Service Set Identifier), and a network ID of a response non-target AP. Details thereof will be described later.

For example, as illustrated in FIG. 4, the STA may broadcast a probe request frame including a list (e.g., an exclusion list) indicating information regarding a response non-target AP via the channel 1. When an AP (e.g., AP 1-1, AP 1-2, . . . , AP 1-n), which has received the probe request frame, corresponds to the list indicating information regarding a response non-target AP included in the probe request frame, the corresponding AP does not transmit a probe response frame to the STA.

As described above, the probe request frame according to an embodiment of the present invention may include one of the list indicating information regarding a response target AP and the list indicating information regarding a response non-target AP, and may include both the list indicating information regarding a response target AP and the list indicating information regarding a response non-target AP and may be transmitted.

The probe request frame according to an embodiment of the present invention may include capability information regarding a station or preference information regarding a response target AP, as well as the list (e.g., an inclusion list) indicating information regarding a response target AP and the list (e.g., an exclusion list) indicating information regarding a response non-target AP as described above.

The capability information regarding a station may include at least one of extended capability information regarding a station, high throughput (HT) capability information, very high throughput (VHT) capability information, high efficiency WLAN (HEW) capability information, and security capability information. The preference information regarding a response target AP may include at least one of security preference information regarding a response target AP, capability preference information regarding a response target AP, Internet access preference information, operating condition preference information regarding a response target AP, and network preference information.

Referring to FIG. 4, the STA transmits a probe request frame including at least one of capability information regarding a station and preference information regarding a response target AP via a channel (S420). In response thereto, the STA receives a probe response frame from the AP satisfying the information (capability information regarding a station or preference information regarding a response target AP) included in the probe request frame (S430). Based on the capability information regarding a station and the preference information regarding a response target AP, when the AP, which has received the probe request frame, receives an association request from the STA afterwards, it may not permit an association of the STA, or if capability of the station or preference regarding a response target AP is not satisfied, the AP may not transmit a probe response frame to the STA or transmit a null probe response frame to the STA (S435).

For example, the STA may transmit a probe request frame including capability information regarding a station or preference information regarding a response target AP via a channel 3. Upon receiving the probe request frame, when the AP (e.g., AP 3-1, AP 3-2, . . . , AP 3-n) satisfies the capability information regarding a station and the preference information regarding a response target AP based on the information included in the probe request frame, the AP may transmit a probe response frame to the STA. If the AP (e.g., AP 3-1, AP 3-2, . . . , AP 3-n), which has received the probe request frame, receives an association request from the STA afterwards and the AP will not permit an association of the STA because the capability of the STA is not sufficient, the AP may not transmit a probe response frame or may transmit a null probe response frame to indicate that the STA cannot be associated. Also, when the AP, which has received the probe request frame, cannot satisfy preference of the STA, namely, preference with respect to a response target AP, the AP may not transmit a probe response frame or may transmit a null probe response frame to indicate that the STA cannot be associated.

Meanwhile, in the case of the existing active scanning method, the STA should sequentially perform scanning on every channel unconditionally up to a predetermined time, the scanning time may be lengthened more than necessary.

However, in the case of the active scanning method according to an embodiment of the present invention, as illustrated in FIG. 4, the STA generates an intermediate scanning result during scanning and returns it, and when an AP appropriate to be associated is discovered from the intermediate scanning result, the STA may instruct scanning abort (S440). Thus, when the STA discovers an appropriate AP, it may perform scanning abort during scanning, shortening a scanning time.

For example, a service primitive such as "MLME-SCAN-ABORT.request( )" may be included in the IEEE 802.11 standard. The active scanning process performed by the STA may be aborted by using the service primitive. Also, by extending a "MLME-SCAN.confirm( ) service" primitive, an intermediate scanning result may be returned during active scanning to allow the STA to check APs discovered up to a particular timing. Even after the STA instructs scanning abort during active scanning, information regarding an AP discovered up to the abort timing is returned. Here, when the STA receives a null probe response frame, the "MLME-SCAN.confirm( )" service primitive may transfer the information together, and if a response code is received together, the "MLME-SCAN.confirm( )" service primitive may also transfer the particulars so that MESHID, BSSID, or the like, of the AP (or STA) which has transmitted the null probe response frame may be removed from the inclusion list and may be included in the exclusion list so as to be excluded from probe response targets in a next scanning session. When an appropriate AP is discovered from the intermediate scanning result returned during the active scanning as described above, the STA may instruct scanning abort and select an AP to be associated by using AP information discovered up to the abort timing.

Also, in the active scanning method according to an embodiment of the present invention, a selective scanning method whereby a channel having a high likelihood of having an AP is preferentially scanned to rapidly discover an appropriate AP is provided.

Referring to FIG. 4, the STA selects a next channel to be scanned based on the information included in the received probe response frame. The probe response frame may include neighbor AP information such as an AP channel report element, a neighbor report element, or the like. The AP channel report element is an element defined in the IEEE 802.11k technology, which includes a list of channels in which the STA has high probability of discovering an AP.

For example, after the STA transmits a probe request frame with respect to a first channel at an initial stage of active scanning, if a probe response frame received from an AP includes an AP channel report element, a neighbor report element, or the like, the channels reported to be included in the element have a high probability of having APs. Thus, when the STA selects a channel to be scanned next from the list of channels on which the STA performs active scanning, the STA preferentially selects a channel included in the AP channel report element or a neighbor report element. Also, the STA checks an AP channel report element of a probe response frame received via scanned channel each time, and first scans a channel (i.e., a channel on the channel list undergoing active scanning, which has not been scanned yet) among channels included therein. Namely, the STA preferentially uses channel information of an AP channel report element included in the most recently received probe response frame. When a channel to be selectively scanned is selected, an appropriate AP can be more quickly discovered, and when an appropriate AP is discovered, scanning abort may be instructed to abort scanning.

Also, a field for inferring a channel around an AP, location information, and the like, as well as a neighbor report element, may be included in a probe response frame and transmitted. The neighbor report element includes a BSSID, capability, channel information with respect to a neighbor AP present in the vicinity of an AP which has transmitted a probe response frame. A channel to be selectively scanned may be selected based on the information regarding the neighbor AP such as the neighbor report element, or the like. Also, based on information included in information regarding a neighbor AP received in a probe response frame such as a neighbor report element, or the like, when the STA determines that the AP satisfies capability with respect to a station or preference with respect to a response target AP as describe above, the STA may immediately request association from the corresponding AP.

Also, the STA may first selectively perform scanning on a channel having an AP in a position near the STA with reference to location related information such as a location parameter element, a measurement report element, or the like.

As described above, in an additional method besides the selective scanning using a probe response frame, in case of using 2.4 GHz, a channel which is frequently used in general may be preferentially scanned. For example, in a 2.4 GHz WLAN, channels 1, 6, and 11 are most frequently used, so the channels 1, 6, and 11 may be preferentially scanned.

In another additional method, a short beacon such as a measurement pilot frame may be used. The measurement pilot frame is smaller than a beacon and frequently transmitted. Although the STA is in the course of active scanning, if it receives the measurement pilot frame, the STA may preferably scans the channel because an AP surely exists in the channel included in the measurement pilot frame. Or, since the measurement pilot frame includes information regarding an BSSID and basic information regarding an AP, if the STA determines that it can be associated with the corresponding AP based on the information, the STA may abort the currently performed scanning at an early stage through a scanning abort instruction. If the information included in the measurement pilot frame is not sufficient for the STA to determine whether to be associated with an AP, the STA may wait for a beacon frame transmitted from the AP which has transmitted the measurement pilot frame immediately after the measurement pilot frame is received, to additionally search for information included in the beacon frame, and perform association based on the searched information.

Also, a duration up to a next full beacon or a broadcast probe response frame may be indicated in a measurement pilot frame, other short beacon type information, or a short probe response frame. Here, when the STA requires additional information, it may await till the indicated duration and request additional information required for an association from a full beacon or a broadcast probe response frame. Since the STA may accurately know duration information up to a next full beacon or a broadcast probe response frame, it may be in power save mode in the duration.

Also, the STA may refer to a probe response frame requested by a different STA. In particular, in case that a different STA transmits a probe request frame in a broadcast manner, when a probe response frame is received in response thereto, the STA may obtain information regarding an AP with reference to information included in the received probe response frame. The STA may immediately be associated with the corresponding AP if it is possible based on the obtained information regarding the AP or may transmit a probe request frame to the corresponding AP in a unicast manner to more quickly perform scanning.

As described above, when the selective scanning method according to an embodiment of the present invention is used in association with the foregoing scanning abort function, a scanning time can be remarkably reduced.

Meanwhile, a probe request frame according to an embodiment of the present invention may include information regarding a response reception time.

The information regarding response reception time may include information indicating a duration in which a station may receive a probe response frame as a response to the probe request frame on one channel. For example, the information regarding a response reception time may be included in a probe request frame by using a timeout interval information element or a probe response deadline interval information element indicating a duration in which a probe response frame may be received, and details thereof will be described later.

Referring to FIG. 5, the STA transmits a probe request frame including information regarding a response reception time, i.e., information (e.g., a timeout interval element) indicating a duration in which the probe response frame may be received, via a channel (S500). Upon receiving it, an AP (or a mesh STA, an STA of IBSS) checks information regarding a response reception time (e.g., a timeout interval element), and when it is a duration in which a probe response frame may be received, the AP transmits a probe response frame (S510). Meanwhile, when the duration in which the probe response frame may be received has passed, the AP does not transmit a probe response frame (S520).

According to an embodiment of the present invention, the STA clarifies a duration in which the STA, which transmits a probe request frame, may be able to actually receive a probe response frame, in the probe request frame, so that APs may transmit a probe response frame only in the corresponding duration. Thereafter, when the duration clarified in the probe request frame, i.e., the duration in which the probe response frame may be received has lapsed, since the APs do not transmit probe response frames, flooding of probe response frames as mentioned above does not occur.

The existing minimum channel time and maximum channel time are determined by the STA which transmits the probe request frame, but the information on them are not transmitted to the AP (or STA) which receives the probe request frame. Thus, in an embodiment of the present invention, the STA, which transmits a probe request frame, determines a duration (e.g., a timeout interval) in which it may receive a probe response frame in consideration of its minimum channel time and a maximum channel time, and includes the determined duration in a probe request frame, and the duration is transmitted to the APs (or STAs). For example, the timeout interval may be determined as expressed by Equation 1 shown below.

$$\text{MinChannelTime} <= \text{Timeout Interval} <= \text{MaxChannelTime} \quad \text{[Equation 1]}$$

Here, when an AP (or STA) receives a probe request frame including information regarding a duration (e.g., a timeout interval) in which a probe response frame may be received as determined by Equation 1, it transmits a probe response frame to the STA from a timing at which the probe request frame is received to a timing at which the probe response frame reception-available duration (e.g., the timeout interval) has not lapsed, and when the duration has passed, the AP does not transmit a probe response frame. Also, in the case that the AP retransmits a probe response frame, the AP retransmits the probe response frame up to a timing at which the probe response frame reception available duration (e.g., the timeout interval) has not lapsed, and when the timeout interval has lapsed, the AP does not retransmit a probe response frame.

In general, when the STA transmits a probe request frame, it listens to a corresponding channel immediately after the probe request frame is transmitted. However, in some cases, the STA may want to receive a probe response frame by starting listening with some delay, rather than immediately receiving a probe response frame. In this case, the probe request frame may further include information indicating a time at which the STA starts to receive a probe response frame in the probe request frame, in addition to the information indicating the probe response frame reception available duration (e.g., the timeout interval). For example, the information indicating a time at which a probe response frame starts to be received may be included in a probe request frame by using a probe response listen start interval element, and details thereof will be described later.

For example, when only the information indicating the probe response frame reception available duration (e.g., the timeout interval) is included in the probe request frame and transmitted, the STA, which has transmitted the probe request frame, receives a probe response frame in the probe response frame reception available duration immediately after the probe request frame is transmitted, and the AP may transmit a probe response frame only in the probe response frame reception available duration (e.g., the timeout interval).

Meanwhile, when information indicating a time at which a probe response frame starts to be received together with information indicating the probe response frame reception available duration is included in a probe request frame and transmitted, the STA, which has transmitted the probe request frame, starts to listen to a probe response frame starting from a timing at which a probe response frames starts to be received as indicated in the probe request frame (e.g., a probe response listen start interval) after transmitting the probe request frame. The STA receives a probe response frame in the probe response frame reception available duration (e.g., the timeout interval) from a timing at which listening starts, and the AP transmits a probe response frame in the probe response frame reception available duration (e.g., the timeout interval) starting from a timing indicated by the time in the probe request frame at which a probe response frame starts to be received (e.g., the probe response listen start interval). The AP does not transmit a probe response frame before the time at which a probe response frames starts to be received indicated in the probe request frame. (e.g., the probe response listen start interval).

Figure 6A:
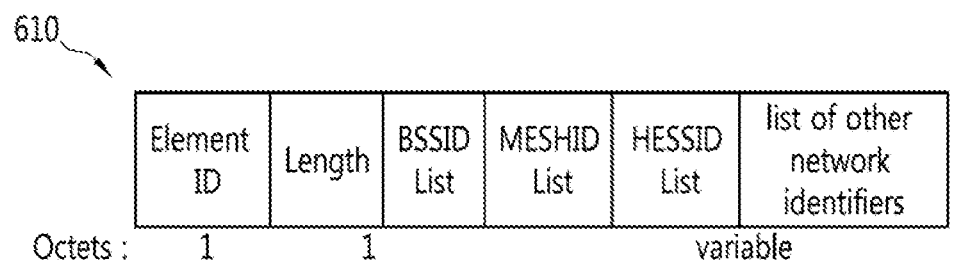
FIGS. 6A-6C illustrate an example of information items included in an inclusion list according to an embodiment of the present invention.
Figure 6B:
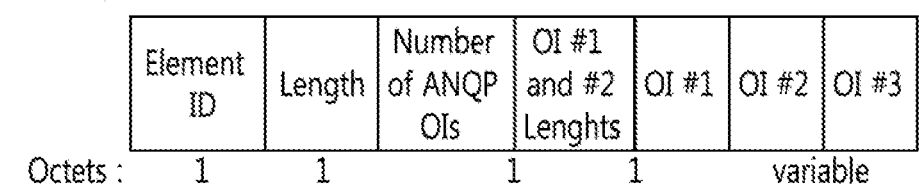
Figure 6C:
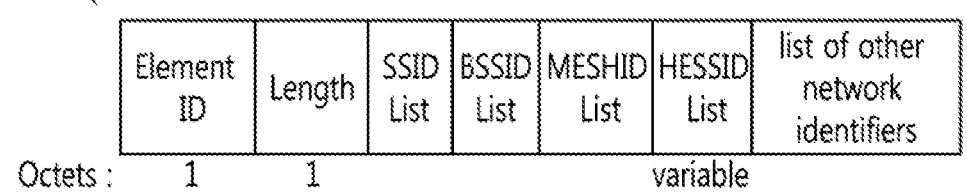

FIGS. 6A-6C illustrate an example of information items included in an inclusion list according to an embodiment of the present invention.

The inclusion list includes information regarding a response target AP which is to respond to the probe request frame as described above. Namely, the inclusion list may include at least one of an SSID (Service Set Identifier), a BSSID (Basic Service Set Identifier), an MESHID (Mesh Identifier), an HESSID (Extended Service Set Identifier), and a network ID of an AP (or an STA) which is to respond to the probe request frame.

The inclusion list may be used by defining an information element, and it is merely an example and may be included in the form of a subfield in a probe request frame. Alternatively, the inclusion list may be included in the form of a subfield in a third information element or field, and the corresponding information element or field may be included in a probe request frame. In the description of the present disclosure, the order of the respective fields of a length thereof is merely illustrative and may be appropriately modified to be used, and some fields may be added or deleted as necessary.

As illustrated in FIG. 6A, an inclusion list element 610 may include Element ID indicating an element identification value, Length indicating a length of the inclusion list, BSSID List indicating a list of BSSID elements with respect to BSSs which should transmit a response with respect to a probe request frame, MESHID List indicating a list of MESHID elements with respect to mesh STAs which should transmit a response with respect to a probe request frame, HESSID List indicating a list of HESSID elements with respect to STAs which should transmit a response with respect to a probe request frame, and other Network identifier List indicating a network identification value.

Here, the Length field may be a value indicating a length of the inclusion list by octet, and the length may be variable. The Other Network identifier List field may be a list of values identifying networks such as a roaming consortium organization identifier, a roaming consortium element, or the like, defined in the IEEE 802.11u technology. For example, a roaming consortium element including information regarding a roaming consortium to which an STA has joined may be defined as illustrated in FIG. 6B so as to be used.

Referring to FIG. 6B, the roaming consortium element 620 may include Number of ANQP OIs indicating a number of roaming consortium OI (Organization Identifier), OI #1 and #2 Lengths indicating a length of OI (Organization Identifier), and OI #1, OI #2 and OI #3 indicating an ID of a roaming consortium.

Here, when a single roaming consortium is designated, only one OI (Organization Identifier), rather than information element form as illustrated in FIG. 6B, may be included in an inclusion list or an exclusion list, and a plurality of OI (Organization Identifier) may be included in the form of a subfield, rather than in the form of an information element, in the inclusion list or exclusion list.

Also, as illustrated in FIG. 6C, the inclusion list element 630 may further include an SSID List field. In this case, the inclusion list element 630 is the same as the format of the exclusion list. The APs (or STAs) included in the existing SSID List may be included in the SSID List of the inclusion list element 630, or the APs (or STAs) included in the existing SSID List may not be used and only the APs (or STAs) included in the SSLID List of the inclusion list element 630 according to an embodiment of the present invention may be used.

Figure 7:
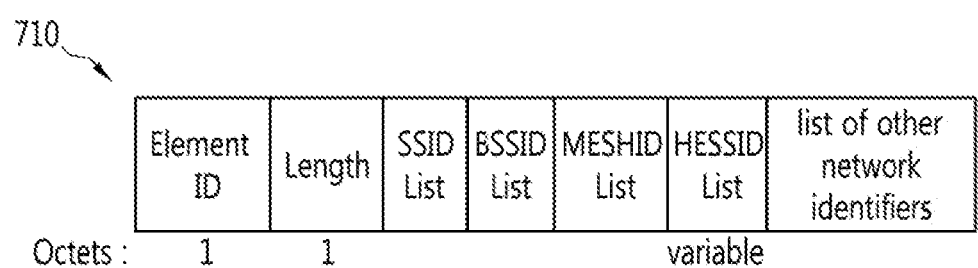
FIG. 7 is a view illustrating an example of information items included in an exclusion list according to an embodiment of the present invention.

FIG. 7 is a view illustrating an example of information items included in an exclusion list according to an embodiment of the present invention.

The exclusion list includes information regarding a response non-target AP which should not respond to a probe request frame as described above. Namely, the exclusion list includes at least one of an SSID (Service Set Identifier), a BSSID (Basic Service Set Identifier), an MESHID (Mesh Identifier), an HESSID (Extended Service Set Identifier), and a network ID of a response non-target AP (or STA) which should not respond to a probe request frame.

The exclusion list may be used by defining an information element, and it is merely an example and may be included in the form of a subfield in a probe request frame. Alternatively, the inclusion list may be included in the form of a subfield in a third information element or field, and the corresponding information element or field may be included in a probe request frame. In the description of the present disclosure, the order of the respective fields of a length thereof is merely illustrative and may be appropriately modified to be used, and some fields may be added or deleted as necessary.

Referring to FIG. 7, an exclusion list element 710 may include Element ID indicating an element identification value, Length indicating a length of the exclusion list, SSID List indicating a list of SSID elements with respect to STAs which should not transmit a response with respect to a probe request frame, BSSID List indicating a list of BSSID elements with respect to BSSs which should not transmit a response with respect to a probe request frame, MESHID List indicating a list of MESHID elements with respect to mesh STAs which should not transmit a response with respect to a probe request frame, HESSID List indicating a list of HESSID elements with respect to STAs which should not transmit a response with respect to a probe request frame, and other Network identifier List indicating a network identification value.

Here, the Length field may be a value indicating a length of the exclusion list by octet, and the length may be variable. The Other Network identifier List field indicating a network identification value may be a list of values identifying networks such as a roaming consortium organization identifier, a roaming consortium element, or the like, defined in the IEEE 802.11u technology. In the above, the roaming consortium element including information regarding a roaming consortium the STA has joined has been described with reference to FIG. 6B according to an embodiment of the present invention.

Meanwhile, an existing "MLME-SCAN.request" service primitive may extend as shown in Table 1 to reflect the foregoing inclusion list and exclusion list.

TABLE 1

MLME-SCAN.request(
    BSSType,
    BSSID,
    SSID,
    ScanType,
    ProbeDelay,
    ChannelList,
    MinChannelTime,
    MaxChannelTime,
    RequestInformation,
    SSID List,
    ChannelUsage,
    AccessNetworkType,
    HESSID,
    MeshID,
    Inclusion List,
    Exclusion List,
    CapabilityFilterInfo,
    VendorSpecificInfo
)

FIGS. 8A-8E are a view illustrating formats of information elements included in the inclusion list or the exclusion list according to an embodiment of the present invention.

Figure 8A:
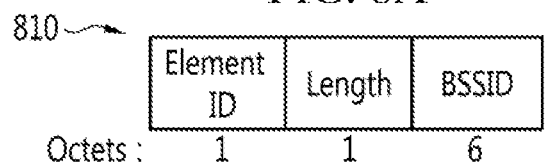
FIGS. 8A-8E are a view illustrating formats of information elements included in the inclusion list or the exclusion list according to an embodiment of the present invention.

Referring to FIG. 8A, a BSSID element 810 may include Element ID indicating an element identification value, Length indicating a length of a BSSID, and BSSID indicating a BSSID or a MAC address of a STA.

Here, the Length field may be a value indicating a length of a BSSID by octet. When all the BSSID fields are 1, it may indicate a wildcard BSSID.

The BSSID element 810 may be included in a form of an information element in the inclusion list or the exclusion list, or may be included in a form of a field in which BSSID information is arranged, rather than an information element form, in the inclusion list or exclusion list.

Figure 8B:
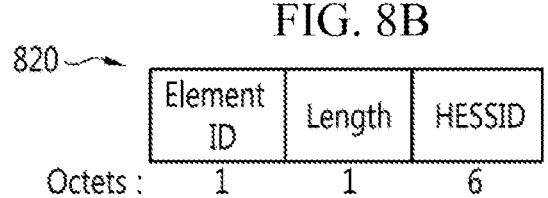

Referring to FIG. 8B, an HESSID element 820 may include Element ID indicating an element identification value, Length indicating a length of a HESSID, and HESSID indicating a HESSID.

Here, the Length field may be a value indicating a length of an HESSID by octet. When all the HESSID fields are 1, it may indicate a wildcard HESSID.

The HESSID element 820 may be included in a form of an information element in the inclusion list or the exclusion list, or may be included in a form of a field in which HESSID information is arranged, rather than an information element form, in the inclusion list or exclusion list.

Figure 8C:
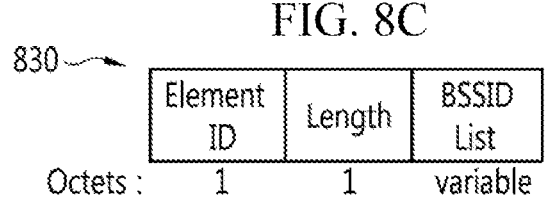

Referring to FIG. 8C, a BSSID element 830 may include Element ID indicating an element identification value, Length indicating a length of a BSSID List, and BSSID List indicating a list of BSSID elements corresponding to respective BSSIDs whose information is requested by an STA.

Here, the Length field may be a value indicating a length of BSSID List by octet, and the length may be variable. The BSSID List field may be a list of BSSID elements 810 illustrated in FIG. 8A. When a value of the Length field is 0, the BSSID List field may indicate a wildcard BSSID.

The BSSID List element 830 may be included in a form of an information element in the inclusion list or the exclusion list, or may be included in a form of a field in which BSSID List information is arranged, rather than an information element form, in the inclusion list or exclusion list.

Figure 8D:
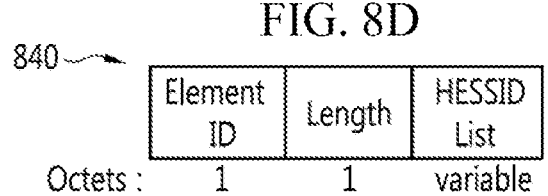

Referring to FIG. 8D, an HESSID element 840 may include Element ID indicating an element identification value, Length indicating a length of an HESSID List, and HESSID List indicating a list of HESSID elements corresponding to respective HESSIDs whose information is requested by an STA.

Here, the Length field may be a value indicating a length of HESSID List by octet, and the length may be variable. The HESSID List field may be a list of HESSID elements 810 illustrated in FIG. 8B.

The HESSID List element 840 may be included in a form of an information element in the inclusion list or the exclusion list, or may be included in a form of a field in which HESSID List information is arranged, rather than an information element form, in the inclusion list or exclusion list.

Figure 8E:
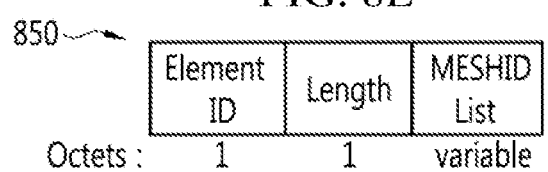

Referring to FIG. 8E, an MESHID element 850 may include Element ID indicating an element identification value, Length indicating a length of an MESHID List, and MESHID List indicating a list of MESHID elements corresponding to respective MESHIDs whose information is requested by an STA.

Here, the Length field may be a value indicating a length of MESHID List by octet, and the length may be variable. The MESHID List field may be a list of HESSID elements including Element ID, Length, and MESHID.

The MESHID List element 850 may be included in a form of an information element in the inclusion list or the exclusion list, or may be included in a form of a field in which MESHID List information is arranged, rather than an information element form, in the inclusion list or exclusion list.

Meanwhile, as described above, a set of response target APs (or STAs) may be limited more minutely by using the inclusion list including at least one of BSSID, SSID, SSID List, HESSID, MESHID, Network ID, and Network ID List of an AP which should respond to a probe request frame.

For example, a condition for minutely confining a set of a response target APs (or STAs) together with the BSSID, SSID, SSID List, HESSID, MESHID, Network ID, and Network ID List information in the inclusion list.

Alternatively, a response target AP (or STA) may be designated by BSSID, SSID, SSID List, HESSID, MESHID, Network ID, Network ID List included in the Inclusion List, without using BSSID, SSID, HESSID, MESHID, and the like, defined in the existing standard. In this case, the BSSID, SSID, HESSID, MESHID, and the like, defined in the existing standard is not included in a probe request frame. For example, the BSSID may not be included in a probe request frame, or a MAC address of an STA transmitting a probe request frame may be included in a probe request frame such that any AP (or STA) may not respond to the probe request frame, or an unused MAC address such as 000 . . . 00, 111 . . . 11, or the like, may be included in a probe request frame. An SSID may not be included in a probe request frame, or an unused SSID value such as a null string, or the like, may be included in a probe request frame so that any AP (or STA) may not respond to a probe request frame. In this case, no target is designated in an existing ID (identifier) and a response target AP (or STA) indicated in the inclusion list is designated.

Alternatively, a set of response target APs (or STAs) may be minutely confined by using the sum of sets of a set of APs (or STAs) designated in the BSSID, SSID, HESSID, MESHID, and the like, defined in the existing standard and a set of response target APs (or STAs) designated in the inclusion list.

Also, as described above, a set of APs (or STAs) which should not respond may be minutely confined by using an exclusion list including at least one of BSSID, SSID, SSID List, HESSID, MESHID, Network ID, and Network ID List of an AP which should not responds to a probe request frame. For example, a condition for minutely confining a set of APs (or STAs) which should not respond may be designated together with the BSSID, SSID, SSID List, HESSID, MESHID, Network ID, and Network ID List information in the exclusion list.

Alternatively, a response target AP (or STA) or APs (or STAs) which should not respond may be confined by using a set of response target APs (or STAs) designated in the inclusion list and a set of APs (or STAs) which should not respond as designated in the exclusion list together. For example, a set of APs (or STAs) which should not respond as designated in the exclusion list may be excluded from the set of response target APs (or STAs) designated in the inclusion list, or a response target AP (or STA) additionally designated in the inclusion list may be added in the set of response target APs (or STAs) designated by applying even the exclusion list.

The probe request frame according to an embodiment of the present invention may include an inclusion list and an exclusion list or may not include them. Alternately, the probe request frame according to an embodiment of the present invention may include only one of the inclusion list and the exclusion list. The same BSSID, SSID, SSID List, HESSID, MESHID, Network ID, and Network ID List may not be included in both the inclusion list and the exclusion list. A legacy AP (or STA) not supporting the active scanning method according to an embodiment of the present invention cannot interpret an information element with respect to the inclusion list and the exclusion list, so although the inclusion list and the exclusion list are included in the probe request frame, the legacy AP (or STA) disregards it and may transmit a probe response frame according to an existing active scanning procedure.

Meanwhile the BSSID, SSID, HESSID, MESHID, and Network ID included in the inclusion list and the exclusion list may use a full BSSID, SSID, HESSID, MESHID, and Network ID, or may use only a portion (substring) of a full ID.

Hereinafter, a method of supporting a substring using only a portion of BSSID, SSID, HESSID, MESHID, and Network ID information included in the inclusion list or the exclusion list will be described.

According to a first method, whether a substring is used may be indicated in a capability field of an extended capabilities element. In order to indicate whether an ID (e.g., BSSID, SSID, HESSID, MESHID, Network ID) included in the inclusion list or the exclusion list is a full ID or a partially included substring, a capability field of the existing IEEE 802.11 standard may extend as shown in Table 2 below and used.

TABLE 2

| Bit | Information | Notes |
|---|---|---|
| ... | ... | ... |
| Xx | Substring is used in inclusion list/exclusion list. | When SSID or MESHID uses a substring in inclusion list/exclusion list, it is set as 1, otherwise, it is set as 0. |
| X x-n | Reserved | |

In such a case, the inclusion list may use a format additionally including SSID List as illustrated in FIG. 6C.

As shown in Table 1, when the SSID or MESHID included in the inclusion list or exclusion list indicates a full ID, "Xx" bit is set as 0, and when the SSID or MESHID indicates a substring, "Xx" bit is set as 1. If the SSID or MESHID indicates a substring, the SSID or MESHID included in the inclusion list or the exclusion list includes the substring and every SSID or MESHID contains the indicated substring is matched. For example, when a substring "SKT" is included in an SSID included in the inclusion list, it may be handled in the same manner as an SSID such as SKT-abcd, SKT-1234 is included in the inclusion list.

In case of introducing a new capability field for a fast link setup, a bit such as "Xx" of Table 1 may be added to the newly introduced capability field and whether to use a substring may be indicated in a similar manner, without extending the existing capability field as mentioned above.

According to a second method, a substring information (SubstringInfo) field indicating whether to use a substring is added to an inclusion list or an exclusion list.

Figure 9A:
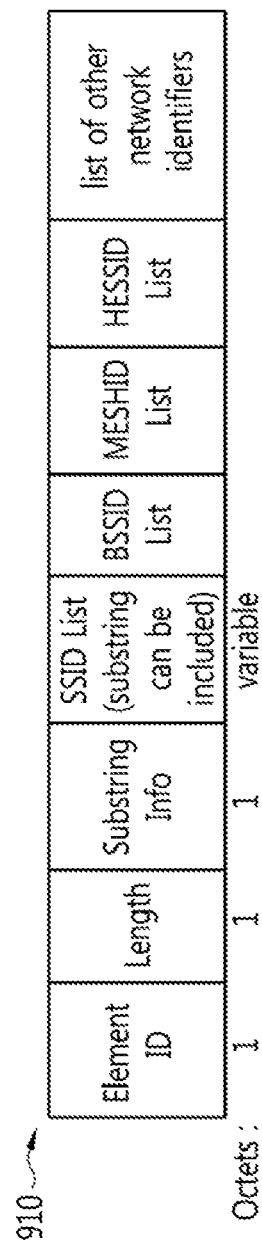
FIGS. 9A-9C illustrate an example of an extended inclusion list, an extended exclusion list and a substring information field format according to an embodiment of the present invention.
Figure 9B:
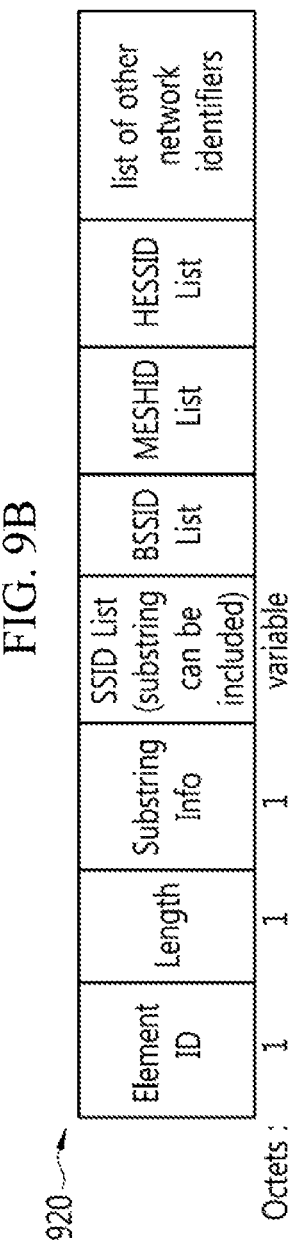
Figure 9C:
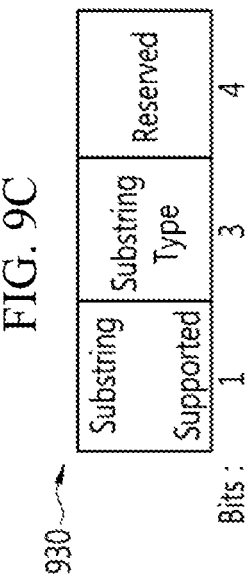

To this end, as illustrated in FIGS. 9A-9C, an extended inclusion list or an extended exclusion list obtained by adding a substring information field to the inclusion list or the exclusion list may be used.

FIGS. 9A-9C illustrate an example of an extended inclusion list, an extended exclusion list and a substring information field format according to an embodiment of the present invention.

Referring to FIG. 9A, the extended inclusion list 910 includes a SubstringInfo field indicating whether a substring is used. The other remaining fields are the same as those of the inclusion list illustrated in FIG. 6C.

Referring to FIG. 9B, the extended exclusion list 920 includes SubstringInfo field indicating whether a substring is used. The other remaining fields are the same as those of the exclusion list illustrated in FIG. 7.

Here, the SubstringInfo field included in the extended inclusion list 910 and the extended exclusion list 920 may be configured as the format illustrated in FIG. 9C.

Referring to FIG. 9C, the SubstringInfo field 930 includes Substring Supported indicating whether an STA uses an SSID or MESHID as a substring, and Substring Type indicating a type of a substring included in the SSID or MESHID.

For example, when a value of the Substring Supported field is 1, it may indicate that a corresponding STA uses the SSID or MESHID as a substring, and when a value of the Substring Supported field is 0, it may indicate that the corresponding STA does not use the SSID or MESHID as a substring. In this case, a value of the Substring Type field may be "reserved".

Table 3 below shows a substring type according to a value of the Substring Type field. This is merely illustrative, and the value of the Substring Type field may be changeable.

TABLE 3

| Value | Meaning |
|---|---|
| 0 | A string used in an SSID or Mesh ID element included in an exclusion list or an inclusion list is an actual SSID or Mesh ID (Namely, a string indicated in a corresponding element is an actual SSID or Mesh ID, rather than a substring). |
| 1 | A string used in an SSID or Mesh ID element included in an exclusion list or an inclusion list is a substring of an actual SSID or Mesh ID. An actual SSID or Mesh ID corresponding to an STA as a probe request target is an SSID or a Mesh ID starting or ending with a substring included in an SSID or Mesh ID element included in an exclusion list or an inclusion list, or including the substring included in an SSID or Mesh ID element included in an exclusion list or an inclusion list. |
| 2 | A string used in an SSID or Mesh ID element included in an exclusion list or an inclusion list is a substring of an actual SSID or Mesh ID. An actual SSID or Mesh ID corresponding to an STA as a probe request target is a Mesh ID starting with a substring included in an SSID or Mesh ID element included in an exclusion list or an inclusion list. |
| 3 | A string used in an SSID or Mesh ID element included in an exclusion list or an inclusion list is a substring of an actual SSID or Mesh ID. An actual SSID or Mesh ID corresponding to an STA as a probe request target is a Mesh ID ending with a substring included in an SSID or Mesh ID element included in an exclusion list or an inclusion list. |
| 4-7 | Reserved |

By using the substring information (SubstringInfo) field as shown in Table 1, whether MESHID or SSID included in the inclusion list or exclusion list is a substring may be indicated, and whether a substring is used is indicated all at once with respect to all the MESHIDs or SSIDs included in the inclusion list or the exclusion list. Namely, with respect to an individual MESHID or SSID, a substring form may not be differently designated but the entirety may be designated by the same option. For example, according to a result of checking a substring information field in the inclusion list or the exclusion list included in a probe request frame, if a substring has been used, every SSID or MESHID using the SSID or MESHID included in the inclusion list or the exclusion list, as a substring is matched.

According to a third method, a substring information (SubstringInfo) field indicating whether a substring is used in the inclusion list or the exclusion list is added. In this method, the foregoing second method is modified such that whether to use a substring may be indicated by using a substring information field with respect to each of the MESHID and SSID.

To this end, as illustrated in FIGS. 10A-10D, an extended inclusion list or an extended exclusion list may be used.

FIGS. 10A-10D illustrate another example of an extended inclusion list, an extended exclusion list, and a substring information field format.

Figure 10A:
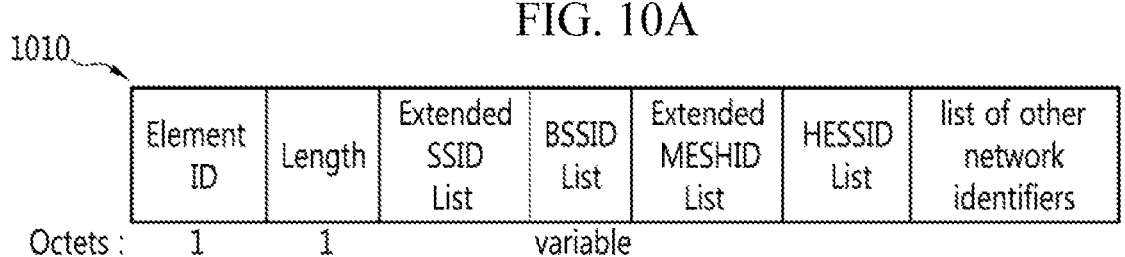
FIGS. 10A-10D illustrate another example of an extended inclusion list, an extended exclusion list, and a substring information field format.
Figure 10B:
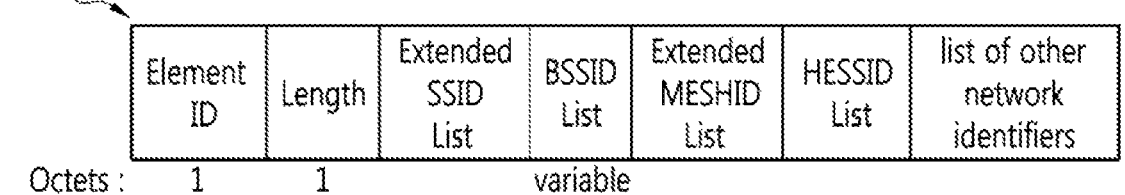

FIG. 10A shows another example of the extended inclusion list 1010, and FIG. 10B is another example of the extended exclusion list 1020. Here, in the extended inclusion list 1010 and the extended exclusion list 1020, the other elements, excluding Extended SSID List and Extended MESHID List elements, are the same as those of the inclusion list illustrated in FIG. 6C and the exclusion list illustrated in FIG. 7. The Extended SSID List element is as shown in FIG. 10C, and the Extended MESHID List element may be configured as shown in FIG. 10D.

Figure 10C:
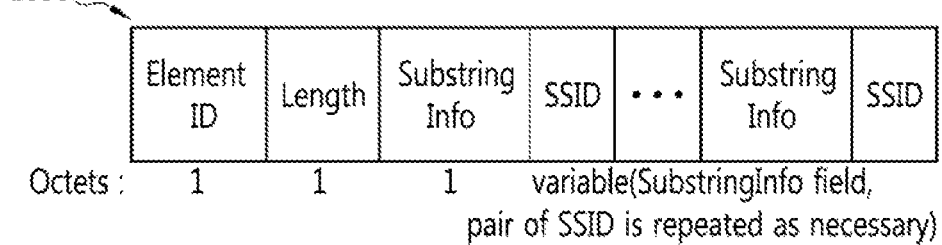
Figure 10D:
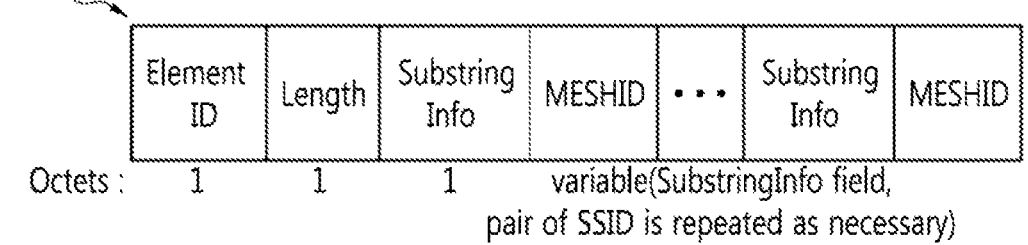

Referring to FIG. 10C, the Extended SSID List element 1030 includes an SSID included in an inclusion list or an exclusion list and a SubstringInfo field indicating whether to use a substring with respect to the SSID, as a pair. Thus, whether to use a substring, or a usage form of a substring may be differently designated for each SSID.

Namely, a pair of SubstringInfo field indicating whether to use a substring with respect to one SSID and a corresponding SSID field is included in the Extended SSID List element 1030 iteratively by an amount of SSIDs included in the inclusion list or the exclusion list. Through this, substrings may be used in different forms with respect to each SSID. Here, in a pair of the SubstringInfo field and the SSID field, the SSID may be used in one of the following two forms.

(i) An SSID field having a 32-octet length is used and a string is included in an SSID field (ii) An SSID element defined in an existing IEEE 802.11 standard is used and a string is included in an SSID field of an SSID element.

An SSID included in a single inclusion list or exclusion list may be used in one of the two forms, and the two forms may not be mixed to be used.

Referring to FIG. 10D, an Extended MESHID List element 1040 includes MESHID included in an inclusion list or an exclusion list and a SubstringInfo field indicating whether to use a substring with respect to the MESHID, as a pair. Thus, whether to use a substring, or a usage form of a substring may be differently designated for each MESHID.

Namely, a pair of SubstringInfo field indicating whether to use a substring with respect to one MESHID and a corresponding MESHID field is included in the Extended MESHID List element 1040 iteratively by an amount of MESHIDs included in the inclusion list or the exclusion list. Through this, substrings may be used in different forms with respect to each MESHID. Here, in a pair of the SubstringInfo field and the MESHID field, the MESHID may be used in one of the following two forms.

(i) An MESHID field having a 32-octet length is used and a string is included in an MESHID field (ii) An MESHID element defined in the existing IEEE 802.11 standard is used and a string is included in an MESHID field of an MESHID element.

An MESHID included in a single inclusion list or exclusion list may be used in one of the two forms, and the two forms may not be mixed to be used.

As described above, when a substring is used in each SSID or MESHID according to results of checking each SubstringInfo field of Extended SSID List, Extended MESHID List in the inclusion list or exclusion list included in the probe request frame, every SSID or MESHID using each SSID or each MESHID included in the inclusion list or the exclusion list as a substring is matched.

Also, the SubstringInfo field included in the foregoing Extended SSID List element 1030 and the Extended MESHID List element 1040 is the same as that described above with reference to FIG. 9C.

Hereinafter, the capability information regarding a station and preference information regarding a response target AP included in a probe request frame according to an embodiment of the present invention will be described in detail.

An AP receives a probe request frame, and when capability of an STA which has transmitted the probe request frame is not sufficient, the AP may not transmit a probe response frame. Or, the AP may transmit a null probe response frame indicating that the STA cannot be associated, to the STA. The AP may determine whether the STA can be associated based on the capability information regarding the station included in the probe request frame, and transmit a probe response frame or a null probe response frame.

Also, when the AP, which has received the probe request frame, does not satisfy preference information regarding an AP included in the probe request frame, the AP may not transmit a probe response frame or may transmit a null probe response frame.

For example, when the AP receives the probe request frame, it may check capability information of the station, e.g., extended capability information, high throughput (HT) capability information, very high throughput (VHT) capability information, high efficiency WLAN (HEW) capability information, and the like, from the probe request frame, and recognize capability of the STA such as whether the STA is a 802.11n STA or 802.11ac STA, how wide of bandwidth the STA can support, and the like. Based on the information, the AP may determine whether to transmit a probe response frame.

Also, when the AP receives the probe request frame, it may check preference information from the STA regarding an AP, for example, requirements by the requesting STA regarding an AP such that a security preference by the STA whether the STA desires not to use security function such as ciphering, or the like although the function is provided by the STA, preference on whether the STA only wants to use HT or VHT AP, preference on whether an Internet access is desired, preference on AP operation condition required by the STA including an access delay of an AP, or an available current admission capacity, and the like, requirements with respect to AP resource such as a bandwidth of an AP, spatial stream utilization, or the like, preference of an advertisement protocol supported by an AP, an access network type preferred by the STA, preference such as venue information in which the AP is located, and the like, from the probe request frame, determine whether the AP may be able to satisfy the conditions with respect to the preference of the STA, and determine whether to transmit a probe response frame based on the determination.

The elements included in the capability information regarding the station and the preference information regarding the response target AP are merely illustrative and the respective elements may be changed into various formats so as to be used, and order, length, and the like, of the elements may be modified as necessary. Also, some of the elements included in the capability information regarding the station and the preference information regarding the response target AP may be selectively used and other elements may be added to be extended.

The capability information regarding the station according to an embodiment of the present invention may be included in the probe request frame by using an RSN (Robust Security Network) information element.

The RSN information element, defined in the existing 802.11, includes information regarding a ciphering algorithm supported by the STA, an authentication method, security capability, and the like. The AP may recognize security processing capability of the STA based on the element. If the STA supports a security option such as a particular ciphering algorithm but does not want to use it, the STA may not include a security parameter such as a corresponding algorithm, or the like, in the RSN information element. Here, PKMID-Count, PKMID List, or the like, among the existing RSN information elementsthat indicate capability, may not be included since they are not essential for indicating the capability.

Or, the capability information regarding the station and the preference information regarding the response target AP according to an embodiment of the present invention may be included in a probe request frame by defining a capability filter information (CapabilityFilterInfo) element.

Figure 11A:
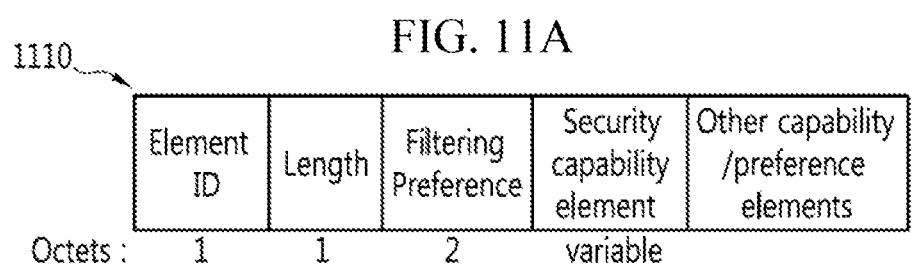
FIGS. 11A-11B are a view illustrating an example of information included in the capability filter information (CapabilityFilterInfo) element.
Figure 11B:
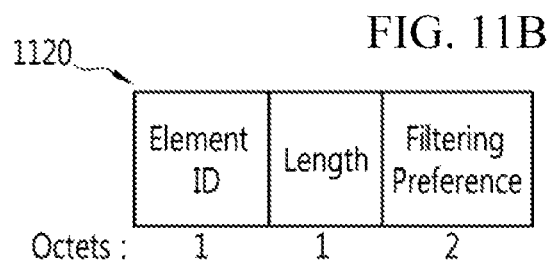

FIGS. 11A-11B are a view illustrating an example of information included in the capability filter information (CapabilityFilterInfo) element. The capability filter information (CapabilityFilterInfo) element is included in a probe request frame, and allows the AP (or STA), which has received the probe request frame, to recognize capability and preference of the STA. Based on the capability filter information (CapabilityFilterInfo) element, the AP may determine whether to transmit a probe response frame to the STA.

Referring to FIG. 11A, capability filter information (CapabilityFilterInfo) element 1110 may include Element ID indicating an element identification value, Length indicating a length of the capability filter information element, Filtering Preference indicating preference information regarding a response target AP, Security capability element indicating security capability of the STA, other capability requested for the AP by the STA, and Other capability/preference elements indicating further preference.

Referring to FIG. 11B, capability filter information (CapabilityFilterInfo) element 1120 may include only an Element ID field, a Length field, and Filtering Preference field indicating preference information regarding a response target AP, by deleting the foregoing Security capability element field and Other capability/preference elements field. In this case, an effect of shortening the length of the capability filter information element 1120 is obtained.

FIGS. 12A-12B illustrate an example of a filtering preference field format included in the capability filter information (CapabilityFilterInfo) element. The format of the filtering preference field according to an embodiment of the present invention is merely an example, and the field order, length, or the like, may be modified as necessary. Also, some of the subfields included in the filtering preference field may be selectively used as necessary, and other subfield than the subfields described hereinafter may be additionally used.

Referring to FIG. 12A, a Filtering Preference field 1210 is a field indicating preference information regarding a response target AP. Here, a Filter Request subfield is a field allowing an AP to determine whether to transmit a probe response frame to an STA in consideration of an AP policy, or the like, based on preference and capability information included in a Filter Request subfield. Namely, the AP may determine whether to use probe request filtering which decides whether to transmit a probe response frame or not based on the Filter Request subfield.

When a value of the Filter Request subfield is 1, an AP (or STA), which has received a probe request frame, checks capability and preference of the STA based on an capability filter information element and information such as HT capability, VHT capability, or the like, included in the probe request frame. When the capability and preference of the STA correspond to a policy of the AP and a supported rate indicated in a supported rate element included in the probe request frame satisfies a rate supported by the AP, the AP transmits a probe response frame. Meanwhile, when a value of the Filter Request subfield is 0, the AP (or STA), which has received a probe request frame, transmits a probe response frame regardless of the preference and capability information included in the Filter Request subfield.

FIG. 12B illustrates another example of the Filtering Preference field format, in which the Filter Request subfield is deleted from the Filtering Preference field 1210 illustrated in FIG. 12A.

When the AP (or STA) receives a probe request frame including the Filtering Preference field 1220 illustrated in FIG. 12B, the AP checks capability and preference of the STA based on the capability filter information element and the information such as HT capability, VHT capability, or the like, included in the probe request frame. When the capability and preference of the STA correspond to a policy of the AP and a supported rate indicated in a supported rate element included in the probe request frame satisfies a rate supported by the AP, the AP transmits a probe response frame. When the AP (or STA) receives a probe request frame not including the capability filter information element, the AP (or STA) transmits a probe response frame regardless of preference and capability information.

Also, when the STA wants to use security processing, a value of the Require Security subfield of the Filtering Preference fields 1210 and 1220 may be set to 1 and it may be included in the probe request frame. When a value of the Require Security subfield value is 1, a security capability element should be necessarily included in the capability filter information element.

The security capability element indicates a security processing capability of the STA. When a value of the security capability element is 1, a Require No Security subfield should be necessarily set to 0.

No matter whether or not the STA supports security processing capability, when the STA does not want security processing, the value of the Require No Security field is set to 1. When the value of the Require No Security is set to 1, the security capability element may not be included.

When the STA does not have particular security preference (security used or security unused), both the Require Security subfield and the Require No Security subfield are set to 1. In this case, the security capability element should be included in the capability filter information element.

The Require Security subfield and the Require No Security subfield may indicate preference according to a subfield value as shown in Table 4 below. The values of the subfield illustrated in Table 4 is merely an example and may be changed, and the preference is also merely an example.

TABLE 4

| Require Security | Require No Security | Meaning |
|---|---|---|
| 1 | 1 | Requesting STA does not have any particular security preference<br>Security capability element should be included in CapabilityFilterInfo element |
| 1 | 0 | Requesting STA requests to process security<br>Security capability element should be necessarily included in CapabilityFilterInfo element |
| 0 | 1 | Requesting STA requests not to process security<br>There is no need for Security capability element to be included in CapabilityFilterInfo element |
| 0 | 0 | Reserved |

Meaning of the Require HT, Require VHT, Require non-HT included in the filtering preference field 1210 illustrated in FIG. 12A and the filtering preference field 1220 illustrated in FIG. 12B may be organized as shown in Table 5 below. The values of the subfields illustrated in Table 5 are merely examples and may be changed, and preference is also merely an example.

TABLE 5

| Require HT | Require VHT | Require non-HT | Meaning |
|---|---|---|---|
| 1 | 1 | 1 | No preference |
| 1 | 0 | 0 | Requesting STA wants to be associated only with HT STA |
| 0 | 1 | 0 | Requesting STA wants to be associated only with VHT STA |
| 0 | 0 | 1 | Requesting STA wants to be associated only with non-HT STA |
| 1 | 1 | 0 | Requesting STA wants to be associated with HT STA or VHT STA |
| 1 | 0 | 1 | Requesting STA wants to be associated with HT STA or non-HT STA |
| 0 | 1 | 1 | Requesting STA wants to be associated with VHT STA or non-HT STA |
| 0 | 0 | 0 | Reserved |

Preference may be added by using the "Reserved" field illustrated in Table 4 and Table 5. For example, when the STA wants to be connected to an AP only when signal strength greater than a particular value, such information may be added to the "Reserved" field and used.

FIG. 13 illustrates an example of a security capability element field format included in a capability filter information (CapabilityFilterInfo) element according to an embodiment of the present invention.

Referring to FIG. 13, a security capability element 1310 indicates security capability of an STA.

Version, Pairwise Cipher Suite Count, Pairwise Cipher Suit List, AKM Suite Count, AKM Suite List, RSN Capabilities fields in the security capability element 1310 may be used in the same manner as that of the RSN element of the existing 802.11. In the existing RSN element, only one of Group Data Cipher Suite, Group Management Cipher Suite is designated, but in an embodiment of the present invention, a number of them may be designated to allow the STA to designate several preferred Cipher Suites.

A Group Data Cipher Suite Count field indicates a number of Group data cipher suite selectors indicated in a Group Data Cipher Suite List. A Group Data Cipher Suite List includes a list of supported Group Data Cipher Suites. The Group data cipher suite field is used to protect a group addressed frame in a BSS. The Group Management Cipher Suite Count field indicates a number of Group Management cipher suite selectors included in a Group Management Cipher Suite List field. The Group Management Cipher Suite List field includes a list of supported Group Management Cipher Suites. The Group management cipher suite field is used to protect a group addressed robust management frame.

If the STA does not want to use a particular Cipher Suite although it supports it, the corresponding Cipher Suite may not be included in the security capability element 1310 and may be used for the purpose of indicating security preference of the STA.

In case that the capability filter information element is included in the probe request frame, when an AP (or STA), which has received the probe request frame, determines that it can satisfy the preference of the STA included in the capability filter information element or when the STA has capability of being associated with the AP, the AP transmits a response frame. Hereinafter, a specific example of using a probe response filtering method for determining whether to transmit a response frame by an AP upon receiving a probe request frame including such capability filter information will be described.

When the capability filter information element is included in a probe request frame, the AP (or STA), which has received it, transmits a response frame when it can satisfy preference of the requesting STA included in the capability filter information element or when the requesting STA has capability of being associated with the AP (or STA).

The AP (or STA) responds by a probe response frame only when the following conditions are met, and when the following conditions are not met, the AP (or STA) may not transmit a probe response frame or transmit a null probe response frame.

(a) In case that the Filter Request subfield in the capability filter information element is set to 0, the AP (or STA) transmits a probe response frame as a response. Or, when both (b) and (c) as described hereinafter are met, the AP (or STA) transmits a probe response frame.

(b) In case that the Filter Request subfield in the capability filter information element is set to 1,
  1) the STA satisfies security processing preference stated in the Require Security subfield and the Require No security in the capability filter information element,
  2) the STA satisfies preference stated in the Require HT subfield, the Require VHT subfield, and the Require non-HT subfield in the capability filter information element, and
  3) the Require Security subfield is 1 and the Require No Security subfield is 0, and when security capability of the requesting STA satisfies the security policy of the AP, the AP transmits a probe response frame. If both the Require Security subfield and Require No Security subfield are set to 1 and the STA wants security processing, the AP transmits a probe response frame as a response only when the security capability of the requesting STA satisfies the security policy of the AP. In case that both the Require Security subfield and Require No Security subfield are set to 1 and the AP does not want security processing with respect to the requesting STA, the AP transmits a probe response frame as a response regardless of security capability of the requesting STA.

(c) When the Filter Request subfield of the capability filter information element is set to 1 and rates stated in Supported rates element of the probe request frame transmitted by the STA support all the rates (rates included in BSSBasicRate- Set parameter) requested by the AP, the AP transmits a probe response frame as a response.

The case that security capability of the requesting STA does not satisfy the security policy of the responding AP (or STA) refers to the following case.

(1) Group Data Cipher Suite, Pairwise Cipher Suite, AKM Suite, or Group Management Cipher Suite requested by the AP are not included in the security capability element, (2) While the AP supports CCMP or HT, the requesting STA supports only TKIP or a previous legacy cipher suite although the requesting STA is an HT STA, (3) When the AP is RSNA-enabled and intends to certainly use RSNA with the requesting STA, the AP checks a value of MFPC and MFPR of the RSN capability field to find that these values are inappropriate for the requesting STA to be associated with the AP, (4) when the AP is an IBSS STA and an requesting STA and an responding IBSS STA do not support a common pairwise cipher suite subset, a common single group cipher suite or a common AKMP, (5) when the AP is an IBSS STA and the IBSS STA supports CCMP or HT, while the requesting STA is an HT STA but supports only TKIP or a previous legacy cipher suite, (6) when the AP is an IBSS STA, a corresponding IBSS STA is RSNA-enabled, and when RSNA is necessarily intended to be used with the requesting STA, values of MFPC and MFPR of RSN capability field of the requesting STA are checked, but the values are inappropriate for the requesting STA to be associated with the responding IBSS STA, (7) When the AP is a Mesh STA and a requesting Mesh STA and a responding Mesh STA do not support a common pairwise cipher suite subset or a common single group cipher suite, or (8) When the AP is a Mesh STA and the STA supports WEP-40, WEP-104, or TKIP by pairwise cipher suite or group cipher suite.

Meanwhile, in an embodiment of the present invention, the capability element illustrated in FIG. 13 may not be used and an existing RSN information element may be used. An existing RSN information element, instead of the security capability element, may be used in the capability filler information element. Here, among the existing RSN information elements, PKMID-Count, PKMID List, or the like, are not essential, so they may not be included.

The RSN information element may include only one Group Data Cipher Suite and one Group Management Cipher Suite, but in the security capability element according to an embodiment of the present invention, the RSN information element extends to include a list to support several Group Data Cipher Suite and several Group Management Cipher Suite. However, for the convenience of implementation, an RSN information element may be used, and FIG. 14 illustrates an example of the capability filter information element using the same.

Figure 14:
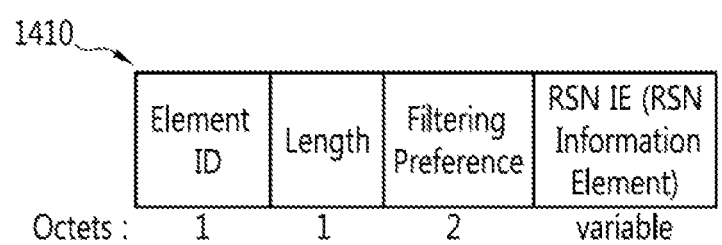
FIG. 14 illustrates another example of capability filter information (CapabilityFilterInfo) using an RSN information element according to an embodiment of the present invention.

FIG. 14 illustrates another example of capability filter information (CapabilityFilterInfo) using an RSN information element according to an embodiment of the present invention.

Referring to FIG. 14, the capability filter information element 14510 may include Element ID indicating an element identification value, Length indicating a length of a capability filter information element, Filtering Preference indicating preference information regarding a response target AP, and RSN IE indicating security capability information of an STA.

FIGS. 15A-15B illustrate another example of a security capability element field format included in a capability filter information (CapabilityFilterInfo) element according to an embodiment of the present invention.

Referring to FIG. 15A, a security capability element 1510 may be used by changing the security capability element 1310 illustrated in FIG. 13. Namely, the security capability element 1510 may use only one Group Management Cipher Suite subfield, instead of Group Management Cipher Suite Count subfield and Group Management Cipher Suite List subfield of the security capability element 1310 illustrated in FIG. 13. The other remaining subfields of the security capability element 1510 are the same as those of the security capability element 1310 illustrated in FIG. 13.

As described above, the existing RSN information element may include only one Group Data Cipher Suite and one Group Management Cipher Suite, and the security capability element 1310 illustrated in FIG. 13 extends to include a list supporting several subfields, and the security capability element 1510 illustrated in FIG. 15A extends such that several Group Data Cipher Suite subfields, among Group Data Cipher Suite and Group Management Cipher Suite, are included.

Referring to FIG. 15B, a security capability element 1520 may be used by changing the security capability element 1310 illustrated in FIG. 13. Namely, the security capability element 1520 may use only one Group Data Cipher Suite subfield, instead of Group Data Cipher Suite Count subfield and Group Data Cipher Suite List subfield of the security capability element 1310 illustrated in FIG. 13. The other remaining subfields of the security capability element 1520 are the same as those of the security capability element 1310 illustrated in FIG. 13.

As described above, the existing RSN information element may include only one Group Data Cipher Suite and one Group Management Cipher Suite, and the security capability element 1310 illustrated in FIG. 13 extends to include a list supporting several subfields, and the security capability element 1510 illustrated in FIG. 15B extends such that several Group Management Cipher Suite subfields, among Group Data Cipher Suite and Group Management Cipher Suite, are included.

Figure 16:
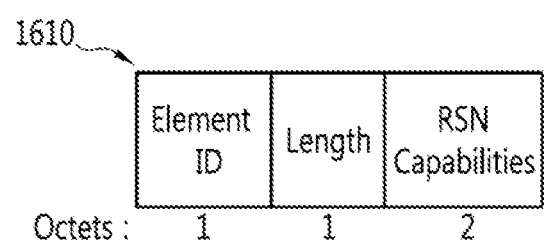
FIG. 16 illustrates another example of a security capability element field format included in a capability filter information (CapabilityFilterInfo) element according to an embodiment of the present invention.

FIG. 16 illustrates another example of a security capability element field format included in a capability filter information (CapabilityFilterInfo) element according to an embodiment of the present invention.

Referring to FIG. 16, a security capability element 1610 may be used by changing the security capability element 1310 illustrated in FIG. 13, and includes an Element ID field, a Length field, and an RSN Capabilities field.

Recently manufactured wireless LAN products support most of the ciphering algorithms required in an RSN standard in many cases, so an increase in the size of the probe request frame may be minimized by including only the RSN Capabilities field while deleting ciphering algorithm information in the security capability element 1310 illustrated in FIG. 13.

Here, the RSN Capabilities field may be configured in the form of a subfield in the capability filter information (CapabilityFilterInfo) element of FIG. 17 as described hereinafter, rather than generating the element form as illustrated in FIG. 16.

Figure 17:
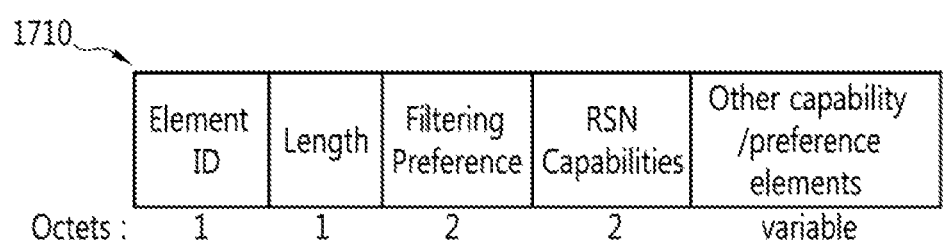
FIG. 17 illustrates another example of the capability filter information (CapabilityFilterInfo) element according to an embodiment of the present invention.

FIG. 17 illustrates another example of the capability filter information (CapabilityFilterInfo) element according to an embodiment of the present invention.

Referring to FIG. 17, a capability filter information (CapabilityFilterInfo) element 1710 may include Element ID indicating an element identification value, Length indicating a length of a capability filter information element, Filtering Preference indicating preference information regarding a response target AP, RSN Capabilities indicating RSN capability of a requesting STA, other capability requested for an AP by a requesting STA, Other capability/preference elements further indicating preference. In this case, the length of the capability filter information element 1710 is shortened.

As described above, the capability information regarding a station and preference information regarding a response target AP according to an embodiment of the present invention may be included in a probe request frame by using the RSN information element. Here, only the RSN capability field, among the fields in the existing RSN element, may be included in the probe request frame. The RSN capabilities element including the RSN capabilities field may have such a form as illustrated in FIG. 16. Namely, the recently manufactured wireless LAN products support most of the ciphering algorithms required in an RSN standard in many cases, so an increase in a size of a probe request frame may be minimized by including only the RSN Capabilities field while deleting ciphering algorithm information from the existing RSN element.

Meanwhile, as described above, although capability information regarding a requesting station satisfies the policy of the responding AP (or STA) and preference information regarding a response target AP is satisfied by the responding AP (or STA), if a current load of the responding AP (or STA) is heavy or the AP (or STA) cannot additionally receive an association request from the STA, the AP (or STA) may not transmit a probe response frame to the STA or may transmit a null probe response frame to prevent the STA from being associated.

FIGS. 18A-18B illustrate another example of capability filter information (CapabilityFilterInfo) according to an embodiment of the present invention.

The capability filter information (CapabilityFilterInfo) may include additional information to allow the AP to perform filtering elaborately. By using the capability filter information element including such additional information, the AP may elaborately determine whether to transmit a probe response frame.

Referring to FIG. 18A, a capability filter information (CapabilityFilterInfo) 1810 may additionally include a Supported Credential Type indicating credential type information supported by an STA.

For example, the Supported Credential Type field may indicate credential information as to whether an STA supports a SIM, a USIM, or an NFC, whether the STA uses a Pre-Shared key, whether the STA supports X 509 authentication certificate, whether the STA supports a Username/ Password scheme, whether the STA uses One Time Password, whether the STA supports only server-side authentication, or the like. The Supported Credential Type field including such credential information may be configured as illustrated in FIG. 18B.

The order and length of the Supported Credential Type field illustrated in FIG. 18A may be modified, and the Supported Credential Type illustrated in FIG. 18B may include only a particular field as necessary.

The requesting STA includes information regarding a security token supported by the STA, a credential type, a supportable authentication method, and the like, in a probe request frame and transmits the frame, and when the requesting STA does not support the credential required for authentication by the AP, the AP does not transmit a probe response frame because the STA cannot be associated to the AP.

However, in the related art, in order for the STA to know a credential type required for an authentication scheme supported by a particular AP, the STA transmits a probe request frame, receives a probe response frame, and checks whether the corresponding AP supports an advertisement function (ANQP) of 802.11u. Upon checking, the STA receives security credential information from the corresponding AP through a GAS query, checks whether the corresponding credential is supported, and attempts association, causing inconvenience. Thus, when the credential information supported by the STA is included in a probe request frame, such an additional query/response process is not required to be performed, and when the STA does not support credential information, filtering may be immediately performed to make the association process fast.

Figure 19:
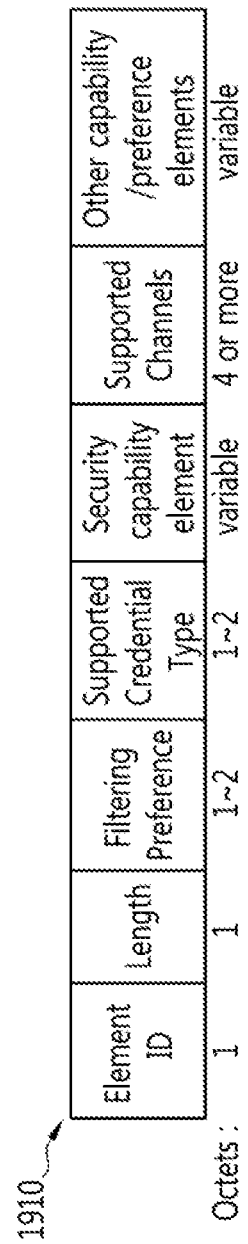
FIG. 19 illustrates another example of capability filter information (CapabilityFilterInfo) according to an embodiment of the present invention.

FIG. 19 illustrates another example of capability filter information (CapabilityFilterInfo) according to an embodiment of the present invention.

Referring to FIG. 19, the capability filter information (CapabilityFilterInfo) element 1910 may additionally include a Supported Channels field indicating channel information supported by an STA. By adding the Supported Channels field, the AP may perform filtering more elaborately.

The Supported Channels field is a list of channel subbands supported by the STA, in which a pair of a first channel number and a number of channel of a channel subband supported by the STA may be repeatedly included. Of course, a supported channel information may be expressed in a different manner.

For example, upon recognizing supported channels information of the STA, if the AP does not support a channel requested by the STA, the AP does not transmit a probe response frame.

FIG. 20 illustrates another example of a Filtering Preference field format included in a capability filter information (CapabilityFilterInfo) element according to an embodiment of the present invention. The Filtering Preference field may include Internet access preference information as preference information regarding a response target AP.

Referring to FIG. 20, a Filtering Preference field 2010 may include a Require Internet Access subfield indicating whether an STA wants Internet access. The other remaining subfields excluding the Require Internet Access subfield, may be configured to be the same as those of the filtering preference field 1220 illustrated in FIG. 12B.

For example, when the STA wants Internet access, the STA may set a value of the Require Internet Access subfield as 1, includes it in a probe request frame, and transmits the same. Upon receiving it, when an AP does not support the Internet access of the STA, the AP does not transmit a probe response frame. Meanwhile, when a value of the Require Internet Access subfield is set to 0, since the STA does not want Internet access, the AP may transmit a probe response frame.

Meanwhile, in case that a load of the AP is heavy, when a channel state is poor, or when admission capacity is full, although the AP transmits a probe response frame to the STA, there is a high possibility of failure when the STA requests association to the AP afterwards. In this case, when the AP is not available for an association of a new STA in consideration of its operating situation, the AP may not transmit a probe response frame. Also, the STA may explicitly request an operation condition from the AP.

FIGS. 21A-21B illustrate an example of information included in an AP operating condition preference element according to an embodiment of the present invention. The AP operating condition preference element may not be a form of an information element and the STA may include desired AP operating condition preference information in a probe request frame by using an appropriate format and transmit the same to the AP. Also, the AP operating condition preference element may be included in the foregoing capability filter information element, or may be configured as a separate element or field and included in a probe request frame.

Referring to FIG. 21A, an AP operating condition preference element 2110 may include Element ID indicating an element identification value, Length indicating a length of the AP operating condition preference element, AP Access Delay requirement indicating requirements with respect to AP access delay such as current average access delay of an AP, access delay of each access category, and the like, AP Available Admission Capacity Requirement indicating requirements with respect to current admission capacity of the AP, and Other AP operating condition requirement for requesting operating condition with respect to other APs.

For example, in case that a maximum value of current average access delay of the AP, access delay of each access category, and the like is 100, when the STA sets the numeral value as 90 or smaller in an AP Access Delay requirement and transmits a probe request frame, if a delay numerical value of the AP exceeds 90, the AP does not transmit a probe response frame because it does not satisfy the delay level required by the STA. Also, in case that the STA requests extra admission capacity as 10 in an AP Available Admission Capacity Requirement field, when a current situation of the AP has admission capacity less than 10, the AP does not transmit a probe response frame.

Also, as illustrated in FIG. 21B, an AP operating condition preference element 2110 may further include requirements of the STA with respect to a current situation such as a current spatial stream utilization of the AP, channel utilization of each band, and the like.

When the AP, which has received a probe request frame including the foregoing AP operating condition preference element, has a heavy load so it cannot satisfy the access delay, admission capacity, and leeway of channel utilization, the AP does not transmit a probe response frame to the STA to prevent the STA from unnecessarily attempting an association.

Meanwhile, the STA may include network preference information regarding a service type of a network connected through the AP, a supported protocol, an access scheme supported by the network, a venue in which the network is located, and the like, in a probe request frame and transmit the same. Upon receiving the probe request frame including such information, if the AP does not satisfy the network preference information of the STA, the AP does not transmit a probe response frame. Hereinafter, AP network preference information preferred by the STA will be described with reference to FIGS. 22A-22D.

FIGS. 22A-22D illustrate an example of information included in an AP network preference element according to an embodiment of the present invention. The AP network preference element may not necessarily be a form of an information element and the STA may include its desired AP network preference information in a probe request frame by using an appropriate format and transmit the same to the AP. Also, the AP network preference element may be included in the foregoing capability filter information element or may be configured as a separate element or field and included in the probe request frame.

Referring to FIG. 22A, the AP network preference element 2210 may include Network Filtering Control, Preferred Advertisement Protocol indicating a preferred network protocol, Supported Device type indicating a device type supported by an STA, Preferred Access Network indicating information regarding a preferred access network, Required Service indicating information regarding a service desired to be used through an AP, and Reserved reserved for different information afterwards.

The Network Filtering Control field will be described in detail with reference to FIG. 22B.

The Preferred Advertisement Protocol field may include network discovery protocol demand, such as ANQP supported in 802.11u, support demand of Emergency Alert system protocol, MIH Information Service, MIH Command and Event Service Capability Discovery, or the like, the STA wants to use to discover an AP. For example, when the STA wants to use the network discovery function but the AP does not support it, the AP does not transmit a probe response frame. The Preferred Advertisement Protocol field including such information may be configured as shown in FIG. 22C.

The Supported Device type field may indicate whether the STA is a smart phone, a VoIP phone, a notebook computer, a game console, a digital camera, a printer, or the like. When such information is included in the probe request frame and transferred to the AP, if the AP permits only an access of a particular device or does not support a service with respect to the corresponding device, the AP does not transmit a probe response frame.

The Preferred Access Network field may indicate a type of an access network the STA wants to use. For example, WLAN, 3GPP, WiMAX, or the like, may be stated in the Preferred Access Network field and transmitted to the AP. In case that the STA uses WLAN and does not want to be automatically switched to 3GPP due to a problem such as a charge incurrence, or the like, by an ISP, the STA may set WLAN require=1, 3GPP require=0", or the like, in the Preferred Access Network, to thus state preference with respect to an forcible access of the user's STA to a different network by a network provider. The Preferred Access Network field may be configured as shown in FIG. 22D.

The Required Service field may indicate information regarding a service, e.g., a printing service, a VoIP service, a streaming service, Web surfing, or the like, the STA wants to use through an AP.

Also, in the existing 802.11, "venue type" information is included in a probe response frame, or the like, and when an STA does not want to access a particular venue, corresponding information is provided to the AP, and when the AP does not support it, the AP does not transmit a probe response frame. Here, since the element indicating venue information exists in the existing 802.11, it may be utilized to define a venue or a "venue type" may be newly defined to be optimized for a probe request frame.

For example, the STA includes a venue, of which a network the STA is to access, in the "venue info" of an interworking element of the probe request frame to allow an AP, which has received the probe request frame, to determine whether to transmit a probe response frame. Upon checking the venue type, if the AP cannot access the venue, the AP may not transmit a probe response frame.

Also, the AP network reference element 2210 may further include RCPI, RSNI requirements, and the like, of the AP, to allow the AP not to transmit a probe response frame if the AP does not support corresponding link quality.

Referring to FIG. 22B, a Network Filtering Control field may include Filter by supported Adv Protocol indicating performing of filtering allowing not to transmit a probe response frame if a protocol requested by an STA is not included in advertisement protocols (e.g., ANQP, MIH Information Service, MIH Command and Event Services Capability Discovery, Emergency Alert System, or the like) supported by an AP, Filter unsupported device type indicating performing filtering if an AP does not support a device type stated by an STA or the AP does not permit an access thereto, Filter by Access Network Preference indicating performing filtering if requirements with respect to an access network, such as WLAN, 3GPP, WiMAX, or the like, desired by an STA are not met, Filter by supported venue indicating performing filtering if requirements with respect to a venue desired to be accessed by an STA are not met, and Filter by supported service indicating performing filtering if a service desired to be used by an STA is not supported.

Meanwhile, as described above, a probe request frame according to an embodiment of the present invention may include information indicating a duration in which a probe response frame with respect to the probe request frame can be received by the transmitting STA of the probe request. For example, the probe request frame may include a Timeout Interval element indicating a duration in which a station that has transmitted the probe request waits to receive a probe response frame on one channel. Also, in another embodiment, the probe request frame may include a Probe Response listen start interval element indicating a timing at which a probe response frame starts to be received after the probe request frame is transmitted with respect to one channel.

An example of a format indicating a Timeout interval element is illustrated. The timeout interval may be used in any form as long as it may be included in a probe request frame.

The Timeout Interval element and the Probe Response listen start interval element may be used by extending the Timeout Interval element (TIE) present in the existing 802.11 standard. Namely, it may be used by assigning one of reserved values of the Timeout Interval element (TIE) of the existing 802.11 standard.

In Table 6 shown below, the Timeout Interval element is assigned by using No. 5 of the Timeout Internal Type, but it is merely illustrative and a different value of the Timeout Interval Type may be assigned.

Also, in case of using the Probe Response listen start interval element, No. 6 of the Timeout Interval Type may be assigned, but it is merely illustrative and any other values may be assigned.

TABLE 6

| Timeout Interval Type | Meaning | Units |
| --- | --- | --- |
| 0 | Reserved | |
| 1 | Reassociation deadline interval | Time units (TUs) |
| 2 | Key lifetime interval | Seconds |
| 3 | Association Comeback time | Time units (TUs) |
| 4 | Time-to-Start | Time units (TUs) |
| 5 | ProbeResponse deadline interval | Time units (TUs) |
| 6 | Proobe Response listen start interval | Time units (TUs) |
| 7-255 | Reserved | |

When the Timeout Interval element (TIE) of the existing 802.11 standard is extended to be used, an existing element is advantageously utilized without having to define a new element. If a probe response listen start interval is stated in the Timeout Interval element (TIE) of the existing 802.11 standard, a TIE indicating a timeout interval element and a TIE indicating a probe response listen start interval element, namely, two TIEs, are added to a probe request frame. Meanwhile, when the probe response listen start interval is not used, only the TIE indicating a timeout interval element may be included in the probe request frame.

Response reception time information regarding a probe request frame, i.e., timeout interval information or timeout interval information with probe response listen start interval information may be included in a probe request frame by defining a new element.

Figure 23A:
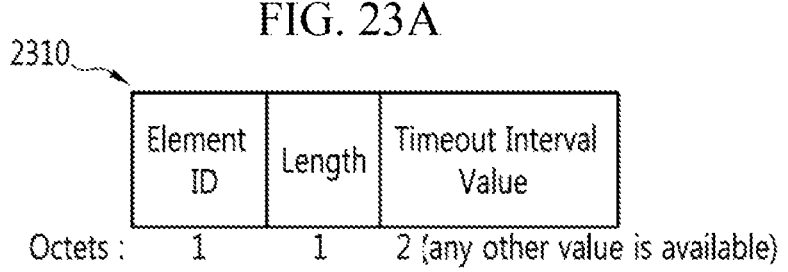
FIGS. 23A-23C are a view illustrating an example of a Timeout Interval element and a Probe Response listen start interval element according to an embodiment of the present invention.
Figure 23B:
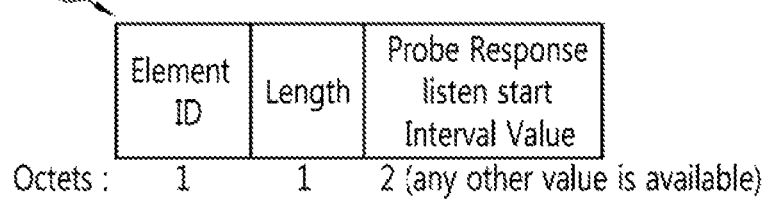
Figure 23C:
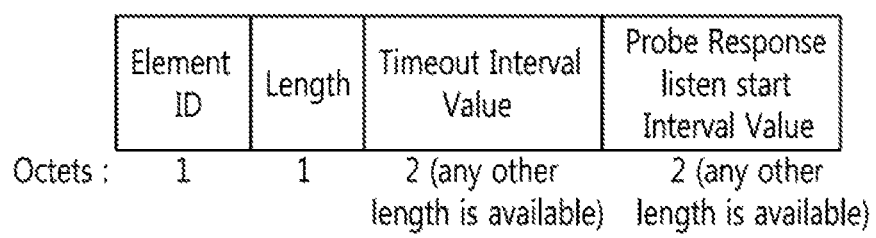

FIGS. 23A-23C are a view illustrating an example of a Timeout Interval element and a Probe Response listen start interval element according to an embodiment of the present invention.

Referring to FIG. 23A, a Timeout Interval element 2310 may include Element ID indicating an identification value of an element, Length indicating a length of the Timeout Interval element, and Timeout Interval Value indicating a duration in which a STA that has transmitted the probe request waits for corresponding probe responses frame on one channel.

Here, in the Timeout Interval Value field, the timeout interval may be indicated by a time unit (TU) or a different unit such as microsecond, or the like. Also, as for a length of the Timeout Interval Value field, one octet, two octets, or any longer length may be allocated according to a used time unit or an allowable maximum time. In the present embodiment, for the description purpose, two octets are illustrated, but in case of an actual application, the length of the Timeout Interval Value field may be shorter or longer as necessary.

Referring to FIG. 23B, a Probe Response listen start interval element 2320 may include Element ID indicating an identification value of an element, Length indicating a length of a probe response listen start interval element, and Probe Response listen start Interval Value indicating a time in which a STA starts to receive a probe response frame after transmitting a probe request frame on one channel.

Here, in the Probe Response listen start Interval Value field, the probe response listen start interval may be indicated by a time unit (TU) or a different unit such as microsecond, or the like. Also, as for a length of the Probe Response listen start Interval Value field, one octet, two octets, or any longer length may be allocated according to a used time unit or an allowable maximum time. In the present embodiment, for the description purpose, two octets are illustrated, but in case of an actual application, the length of the Probe Response listen start Interval Value field may be shorter or longer as necessary.

In case of defining and using a new element as described above, if a probe response listen start interval element is used for indicating the response reception time information, a timeout interval element and a probe response listen start interval element are added to a probe request frame. Meanwhile, if the probe response listen start interval element is not used, only the timeout interval element may be included in the probe request frame.

Also, as illustrated in FIG. 23C, the timeout interval element and the probe response listen start interval element may be defined in the form of one element and used. Here, the Length field may have a variable length. As described above, the Timeout Interval Value field and the Probe Response listen start Interval Value may be indicated by a time unit (TU) or a different unit such as microsecond, or the like. Also, as for a length of the Timeout Interval Value field and the Probe Response listen start Interval Value field, one octet, two octets, or any longer length may be allocated according to a used time unit or an allowable maximum time. In the present embodiment, for the description purpose, two octets are illustrated, but in case of an actual application, the length of the Probe Response listen start Interval Value field may be shorter or longer as necessary.

If the probe response listen start interval element is not used, the Probe Response listen start Interval Value is omitted, and here, the Length field may be set to 2. Also, order of the Timeout Interval Value field and the Probe Response listen start Interval Value field may be changed and may be included in a probe request frame and transmitted.

As described above, the use of the timeout interval element or the probe response listen start interval element as an information element form is merely an example, and it may be configured as a general subfield form and included in the probe request frame. Or, it may be included in the form of a subfield in a third information element or field and the corresponding information element or field may be included in the probe request frame.

The probe request frame according to an embodiment of the present invention may include at least one of the inclusion list, the exclusion list, capability information regarding a station, preference information regarding a response target AP, and response reception time information with respect to a probe request frame, and a method as shown in Table 7 below may be used. Table 7 shows an example of information that may be included in a probe request frame, and the present invention is not limited thereto.

TABLE 7

| Order | Information | Notes |
|---|---|---|
| x | RSN, capability filter information (CapabilityFilterInfo), or RSN capabilities | Method 1: Existing RSN element is included. (RSN element is included when dot11RSNAActivated is true and RSN element is selectively included when dot11FILSActivated is true) Method 2: Newly defined capability filter information (CapabilityFilterInfo) is used. (CapabilityFilterInfo element is selectively included when dot11FILSActivated is true) Method 3: RSN capabilities element including only RSN capabilities in the fields of the existing RSN element is included. (RSN capabilities element is selectively included when dot11FILSActivated is true) These methods are examples, and preference information (whether AP is HT/VHT, preference of STA with respect to AP, load of AP, requirements with respect to admission capacity, resource utilization requirements of AP, Internet access request, credential supported by STA, security token information, supported channel, preferred network, etc.) of STA with respect to AP may be included. |
| x | Timeout Interval (or ProbeResponse deadline interval) | Method 1: Timeout Interval element of existing standard is utilized. Only type is added to be used. (Timeout Interval element (TIE) including timeout Interval is included when dot11FILSActivate is true and any of the fields in the element are nonzero) Method 2: Timeout Interval element is newly defined to be used. |
| x | Probe Response Listen Start Interval | Method 1: Timeout Interval element of existing standard is utilized. Only type is added to be used. (Probe Response Listen Start Interval (TIE) including ProbeResponse deadline interval is included when dot11FILSActivated is true and any of the fields in the element are nonzero) Method 2: Probe Response Listen Start Interval is newly defined to be used. |
| x | Inclusion List | Inclusion List element is selectively included when dot11FILSActivated is true and any of the fields in the element are nonzero. |
| x | Exclusion List | Exclusion List element is selectively included when dot11FILSActivated is true and any of the fields in the element are nonzero. |

Meanwhile, the null probe response frame according to an embodiment of the present invention is a frame in which a frame body is removed from an existing probe response frame. Upon receiving the null probe response frame, the STA does not attempt association (or peering) to the corresponding AP (or STA), and adds the corresponding AP (or STA) in the exclusion list, so that it may not transmit a probe request frame to the corresponding AP (or STA). Also, when the corresponding AP (or STA) is included in the inclusion list, the STA may delete it.

In an embodiment, a Reason code field may be included in a frame body of a null probe response frame. In this case, it is used in the same manner as the case in which the frame body is all eliminated, but when a specific reason for not being able to be associated is included in the reason code field and transmitted, the STA may receive detailed information.

The AP (or STA) may not transmit a null probe response frame and may not transmit a probe response frame. In this case, an effect of reducing a probe response frame is increased, and the STA may still be prevented from being erroneously associated to an AP.

FIG. 24 is a flow chart illustrating a process of performing active scanning by an STA that transmits a probe request frame according to an embodiment of the present invention. The process in which the STA illustrated in FIG. 24 performs active scanning is a processing procedure combining active scanning methods according to an embodiment of the present invention as described above, and is an example of one of possible combinations of the active scanning methods according to an embodiment of the present invention as described above.

Referring to FIG. 24, the STA generates a probe request frame (S2400). Here, the STA may include information regarding a response target AP in the probe request frame.

For example, the STA may include BSSID, SSID, SSID List, HESSID, MeshID, or the like, in the probe request frame to range a range of a response target AP (or mesh STA or STA of IBSS). Also, the STA may include the foregoing inclusion list or exclusion list in the probe request frame. Also, the STA may include the RSN information element or capability filter information element in the probe request frame to inform an AP about the capability information of the STA, and preference information regarding a response target AP. Also, the STA may include a timeout interval as reception time information for waiting a probe response frame in the probe request frame. Details of a method for configuring the information to be included in the probe request frame have been described above so a description thereof will be omitted.

The STA transmits the probe request frame via a selected channel in a broadcast or unicast manner (S2410).

The STA may receive a probe response frame from at least one response target AP based on the information regarding a response target AP included in the probe request frame, and when the probe response frame is successfully received, the STA transmits an ACK frame to the AP (or mesh STA or STA of IBSS) (S2420). If the selected channel is inactive during a minimum channel time, the STA returns to step S2460 and selects a next channel to be scanned.

The STA checks whether a maximum channel time has lapsed (S2430). When the maximum channel time has not lapsed, the STA repeatedly performs of returning to step S2420, receiving a probe response frame, and transmitting an ACK frame. Meanwhile, when the maximum channel time has lapsed, the STA stops scanning a corresponding selected channel.

According to an intermediate scanning result, when a generation option for intermediate result has been set, the STA generates intermediate results scanned up to a current timing (S2440).

The STA checks whether a scan abort has been requested (S2450).

When a scan abort request has been received, the STA generates a final report with respect to a scanned AP up to a termination timing. The scan abort request may be received at any timing during a scanning process, and when the scan abort request is received, scan results up to the timing at which the scan abort request is received are generated as a final report and returned.

When a scan abort request has not been received, the STA checks information regarding an AP channel from the received probe response frame, and when information regarding an AP channel is included in the probe response frame, the STA selects a channel not scanned yet, as a next channel to be scanned based on the information (S2460). For example, when an AP channel is 2.4 GHz, the STA may preferentially select channels 1, 6, and 11, and when a measurement pilot is received, the STA may utilize channel information, AP information, and the like included therein. If there is no such information, the STA sequentially selects a next channel.

The STA checks whether there is a next channel to be scanned (S2470). When a next channel to be scanned exists, the STA may return to step S2410 and transmit a probe request frame to the next channel.

Meanwhile, when a next channel to be scanned does not exist, the STA generates a final report with respect to an AP scanned up to a current timing (S2480), terminates the scanning process, and returns a final report (S2490).

Figure 25:
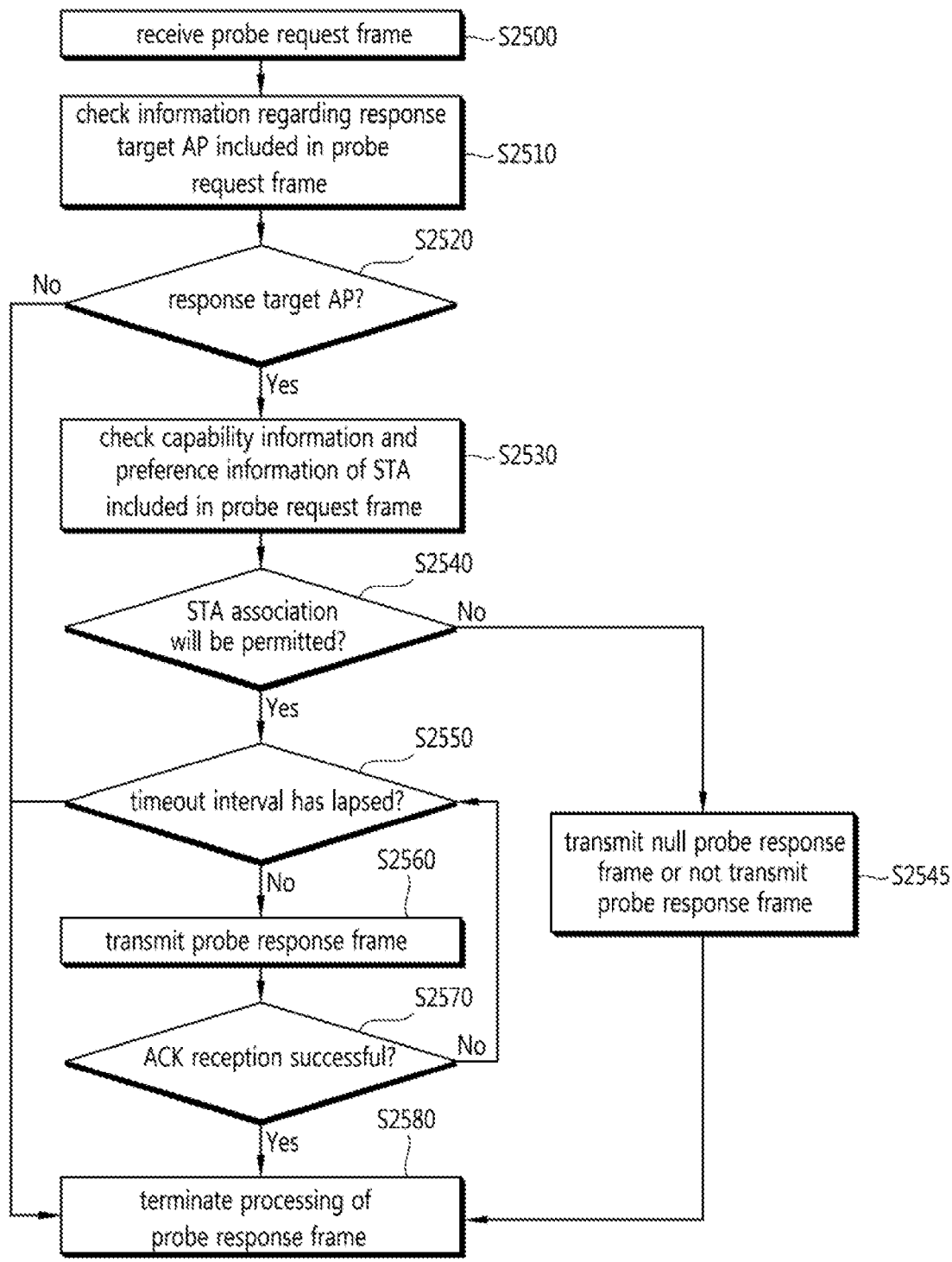
FIG. 25 is a flow chart illustrating a process of performing active scanning by an AP which receives a probe request frame according to an embodiment of the present invention.

FIG. 25 is a flow chart illustrating a process of performing active scanning by an AP which receives a probe request frame according to an embodiment of the present invention. The process of performing active scanning by the AP illustrated in FIG. 25 is a procedure combining the active scanning methods according to an embodiment of the present invention as described above, and illustrates one of available combinations of the active scanning method according to an embodiment of the present invention as described above.

Referring to FIG. 25, an AP (or a mesh STA, or an STA of an IBSS) receives a probe request frame (S2500).

The AP (or the mesh STA or STA of IBSS) checks information regarding a response target AP included in the received probe request frame (S2510). For example, the AP may check SSID, BSSID, SSID List, HESSID, MeshID, inclusion list, exclusion list, and the like, included in the probe request frame.

The AP (or the mesh STA or STA of IBSS) determines whether the AP is a response target AP (S2520). When the AP (or the mesh STA or STA of IBSS) is not a response target AP, the AP terminates the responding process with respect to the received probe request frame.

Meanwhile, when the AP (or the mesh STA or STA of IBSS) is a response target AP, the AP checks capability information regarding an STA and preference information regarding an AP included in the received probe request frame (S2530). For example, the AP may check an RSN information element, capability filter information element, and the like, of the probe request frame. Also, the AP (or the mesh STA or STA of IBSS) may check its current load state, or the like. The capability information regarding an STA and the preference information regarding an AP included in the probe request frame has been described in detail above, so a description thereof will be omitted.

The AP (or the mesh STA or STA of IBSS) determines whether it satisfies preference of the STA based on the capability information regarding an STA and preference information regarding an AP included in the received probe request frame (S2540) that are necessary for association with the STA. Also, the AP (or the mesh STA or STA of IBSS) may determine whether it is capable of accommodating the STA in consideration of its current state.

If the AP (or the mesh STA or STA of IBSS) determines that it will not permit an association of the STA later or the AP (or the mesh STA or IBSS STA) does not satisfy preference of the STA, the AP (or the mesh STA or STA of IBSS) may not transmit a probe response frame or may transmit a null probe response frame without a frame body to the STA to inform the STA that an association of the STA later will not be permitted, or may transmit a null probe response frame including a reason code to even inform the STA about the reason of not permitting an association of the STA later (S2545). And, the AP (or the mesh STA or STA of IBSS) terminates the responding process with respect to the received probe request frame.

Meanwhile, when the AP (or the mesh STA or STA of IBSS) determines that it will permit an association of the STA later or when it satisfies preference of the STA, the AP (or the mesh STA or STA of IBSS) checks timeout interval information regarding a response reception time included in the probe request frame, and determines whether the response reception time has lapsed by comparing the timeout interval information with the duration from a timing at which the probe request frame was received to a current time (S2550). When the response reception time has lapsed, the AP (or the mesh STA or STA of IBSS) does not transmit a probe response frame and terminates the process.

Meanwhile, when the timeout interval has not lapsed, the AP (or the mesh STA or STA of IBSS) transmits a probe response frame (S2560).

The AP (or the mesh STA or STA of IBSS) checks whether an ACK frame with respect to the probe response frame has been received (S2570).

When an ACK frame has been successfully received, it means that the probe response frame was successfully transmitted, so the AP (or the mesh STA or STA of IBSS) terminates the probe response frame processing procedure (S2580).

Meanwhile, when the ACK frame has not been successfully received, a probe response frame should be retransmitted. Thus, the AP (or the mesh STA or STA of IBSS) returns to the step S2550, determines whether the timeout interval has lapsed at a current timing, and retransmits a probe response frame or terminates the probe response frame processing procedure.

Figure 26:
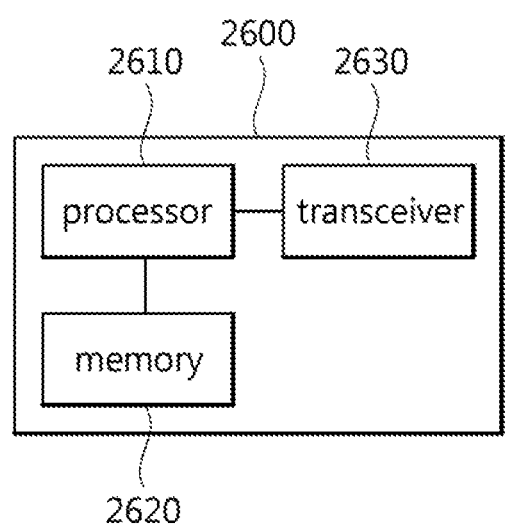
FIG. 26 is a block diagram of a wireless device to which an embodiment of the present invention is applicable.

FIG. 26 is a block diagram of a wireless device to which an embodiment of the present invention is applicable. The wireless device may be an STA or an AP.

Referring to FIG. 26, a wireless device 2600 includes a processor 2610, a memory 2620, and a transceiver 2630.

The processor 2610 implements a function of the STA or the AP in the foregoing embodiments. The processor 2610 generates a probe request frame including information regarding a response target AP (inclusion list, exclusion list), capability information regarding a station, preference information regarding a response target AP, information regarding a response reception time with respect to a probe request frame, and the like. Also, the processor 2610 may determine whether to transmit a probe response frame in response to the probe request frame including the foregoing information, and transmit a probe response frame, transmit a null probe response frame, or may not transmit a probe response frame.

The memory 2620 may generate and store a probe request frame including information regarding a response target AP (inclusion list, exclusion list), capability information regarding a station, preference information regarding a response target AP, information regarding a response reception time with respect to a probe request frame, and the like. Also, the memory 2620 may receive and store a probe request frame and a probe response frame according to an embodiment of the present invention.

The transceiver 2630 may transmit or receive a radio signal and implements a physical layer of the IEEE 802.11 standard. For example, a physical layer supporting HT, VHT, or the like, may be implemented.

The processor 2610 and/or the transceiver 2630 may include an ASIC (Application-Specific Integrated Circuit), a chip set, a logical circuit and/or a data processor. The memory 2620 may include a ROM (Read-Only Memory), a RAM (Random Access Memory), a flash memory, a memory card, a storage medium, and/or any other storage devices. When the embodiments are implemented by software, the foregoing techniques may be implemented by modules (processes, functions, or the like) performing the foregoing functions. The modules may be stored in the memory 2620 and executed by the processor 2610. The memory 2620 may be provided within or outside the processor 2610, or may be connected to the processor 2610 through a well-known unit.

In an embodiment of the present invention, information items added to a probe request frame are designed to be compatible in operating with legacy STAs (or APs). Also, in an embodiment of the present invention, information items added to a probe request frame are defined as information elements, and since a legacy WLAN STA (or AP) disregards it, they are operable without any problem although the legacy STA (or AP) exists in the WLAN system. When the legacy STA (or AP) receives a probe request frame according to an embodiment of the present invention, the legacy STA (or AP) operates according to an active scanning procedure of the existing 802.11.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not limited by the embodiments, and the scope of the present invention should be interpreted based on the following appended claims. Accordingly, the present invention should be construed to cover all modifications or variations induced from the meaning and scope of the appended claims and their equivalents.

What is claimed is:

1. A scanning method of an access point (AP), in a wireless local area network (WLAN) system, the method comprising:

receiving, by the AP, a probe request frame from a station (STA) based on information indicated by the probe request frame, information indicated by the probe request frame comprising information regarding a max channel time, wherein the information regarding the max channel time includes information indicating a time that the station is available after transmission of the probe request frame to receive a probe response frame as responses with respect to the probe request frame in a channel; and determining, by the AP, whether to transmit the probe response frame to the STA based on the information regarding the max channel time, wherein when the max channel time is elapsed, the probe response frame is not transmitted by the AP, wherein whether to transmit the probe response frame to the STA is further determined based on an operating condition of the AP comprising information with respect to an access delay of the AP, and wherein the access delay of the AP is a delay that occurs when the AP accesses a channel, and the probe response frame is not transmitted by the AP when an access delay indicated by the prove request frame is shorter than an average access delay of the AP.

2. The method of claim 1, wherein the STA receives the probe response frame when the AP transmits the probe response frame before the max channel time has not elapsed.

3. The method of claim 1, wherein the probe response frame includes information regarding a neighbor AP, and the information regarding a neighbor AP includes at least one of an AP channel report and a neighbor report.

4. The method of claim 3, further comprising:
- selecting, by the station, a next channel to be scanned based on the information regarding a neighbor AP included in the probe response frame.

* * * * *